US012617421B2

(12) United States Patent
Goto

(10) Patent No.: US 12,617,421 B2
(45) Date of Patent: May 5, 2026

(54) DRIVER ASSISTANCE SYSTEM AND DRIVER ASSISTANCE PROCESSING METHOD, AND RECORDING MEDIUM

(71) Applicant: SUBARU CORPORATION, Tokyo (JP)

(72) Inventor: Ikuo Goto, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 31 days.

(21) Appl. No.: 19/011,762

(22) Filed: Jan. 7, 2025

(65) Prior Publication Data

US 2025/0145171 A1 May 8, 2025

Related U.S. Application Data

(63) Continuation of application No. PCT/JP2023/021651, filed on Jun. 12, 2023.

(51) Int. Cl.
*B60W 50/14* (2020.01)
*B60W 40/08* (2012.01)
*B60W 40/09* (2012.01)

(52) U.S. Cl.
CPC ............ *B60W 50/14* (2013.01); *B60W 40/09* (2013.01); *B60W 2040/0872* (2013.01);
(Continued)

(58) Field of Classification Search
CPC ... B60W 2040/0872; B60W 2050/143; B60W 2050/146; B60W 2540/22;
(Continued)

(56) References Cited

U.S. PATENT DOCUMENTS

| | | | | |
|---|---|---|---|---|
| 9,421,909 B2 * | 8/2016 | Strickland | ............. | G08G 1/166 |
| 10,300,922 B2 * | 5/2019 | Volos | .................... | G07C 5/008 |

(Continued)

FOREIGN PATENT DOCUMENTS

| | | |
|---|---|---|
| EP | 3144862 A1 | 3/2017 |
| JP | 2017-59099 A | 3/2017 |
| JP | 2019-117142 A | 7/2019 |

OTHER PUBLICATIONS

International Search Report (with English translation) and Written Opinion dated Jul. 25, 2023, from International Application No. PCT/JP2023/021651, 8 pages.

*Primary Examiner* — Omer S Khan
(74) *Attorney, Agent, or Firm* — Rimon P.C.

(57) ABSTRACT

A driver assistance system configured to assist in driving vehicles includes a collected data storage and a processor. The processor is configured to calculate a first load state value with a change in driving behavior of a driver of an assistance target vehicle and a second load state value without the change, based on vehicle measurement data and passer-by measurement data, and calculates a total optimization evaluation value based on a difference between the first load state value and the second load state value. The first load state value and the second load state value are load state values indicate a change in load states of drivers of random vehicles and passers-by in a predetermined travel scene while the assistance target vehicle is traveling through the travel scene. The total optimization evaluation value indicates an influence of the driving behavior on the total optimization.

9 Claims, 15 Drawing Sheets

(52) U.S. Cl.
CPC . *B60W 2050/143* (2013.01); *B60W 2050/146*
(2013.01); *B60W 2540/22* (2013.01); *B60W*
*2540/221* (2020.02); *B60W 2556/10* (2020.02);
*B60W 2556/45* (2020.02)

(58) Field of Classification Search
CPC ....... B60W 2540/221; B60W 2556/10; B60W
2556/45; B60W 40/09; B60W 50/14;
G08G 1/16
See application file for complete search history.

(56) References Cited

U.S. PATENT DOCUMENTS

| | | | |
|---|---|---|---|
| 10,399,575 B2 * | 9/2019 | Spasojevic ........... | B60K 28/066 |
| 2019/0195646 A1 | 6/2019 | Iwai et al. | |

* cited by examiner

[ FIG. 1 ]
100
110
105
H
130
143
H
130
143
50
1
50
1
50
1
[ FIG. 2 ]
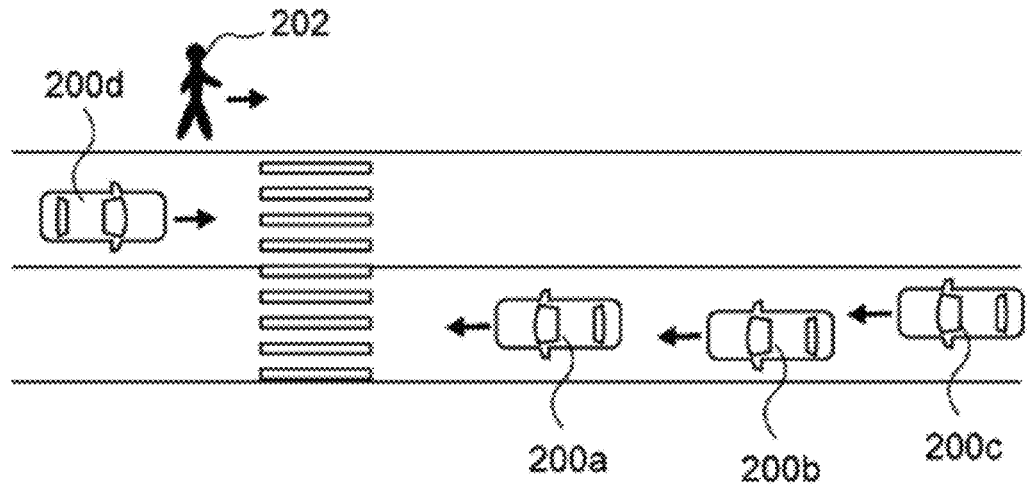
202
200d
200a
200b
200c

[ FIG. 3 ]
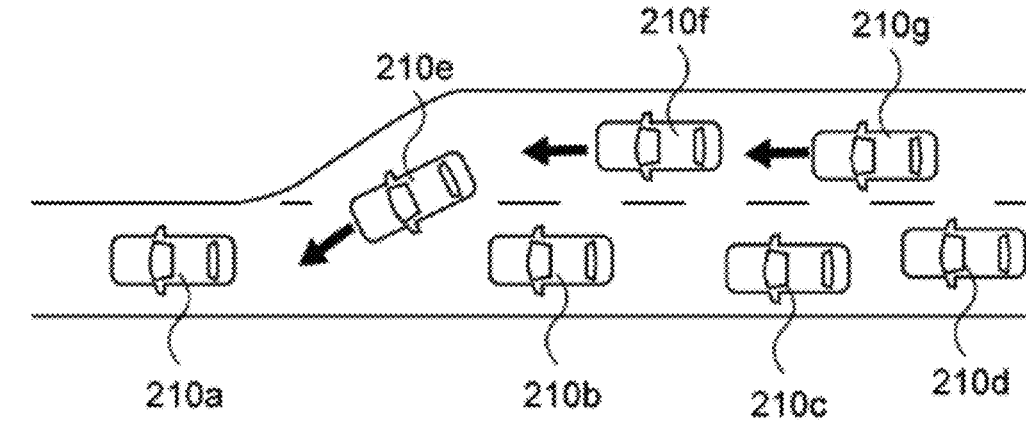
[ FIG. 4 ]
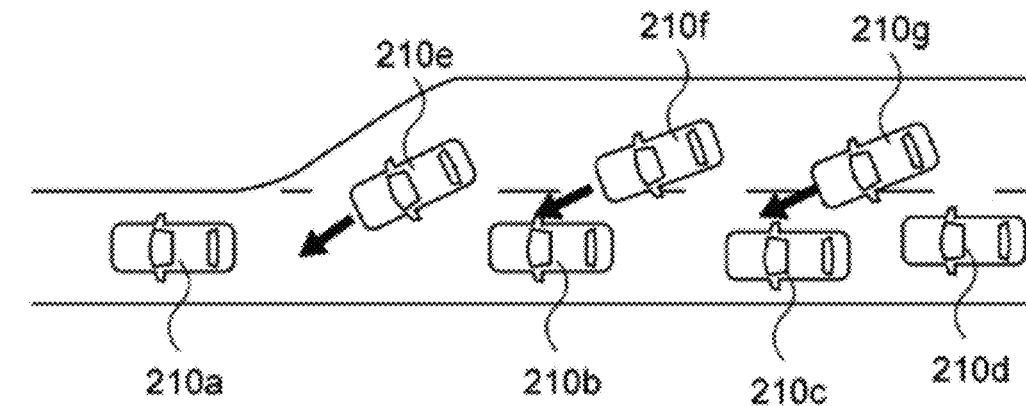
[ FIG. 5 ]
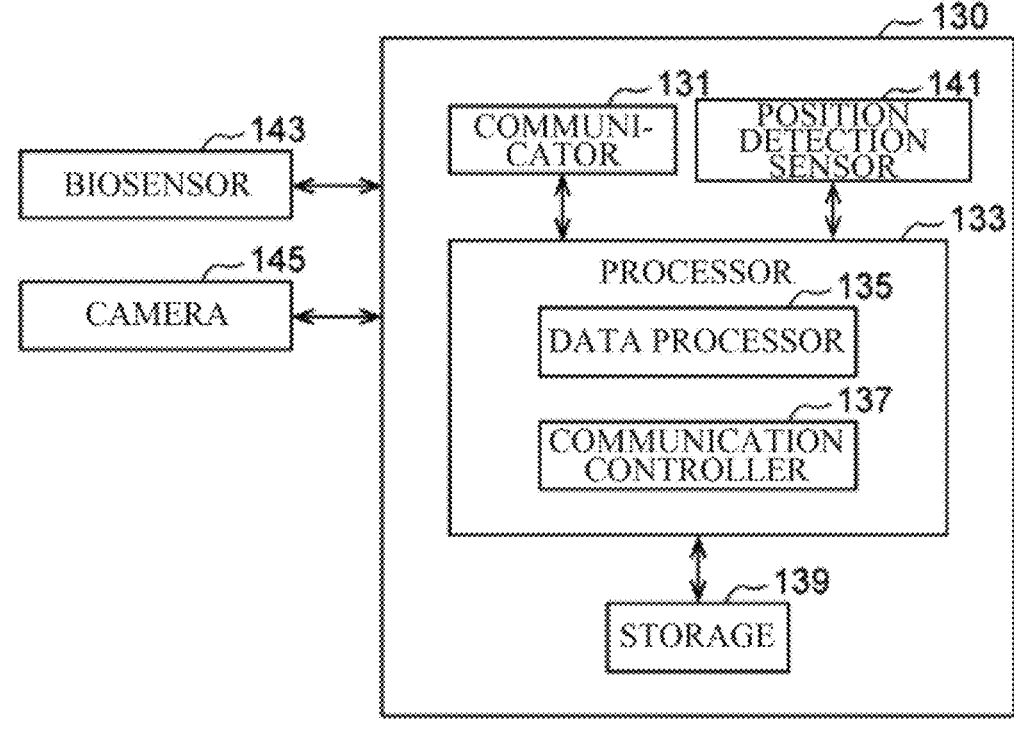

[ FIG. 6 ]
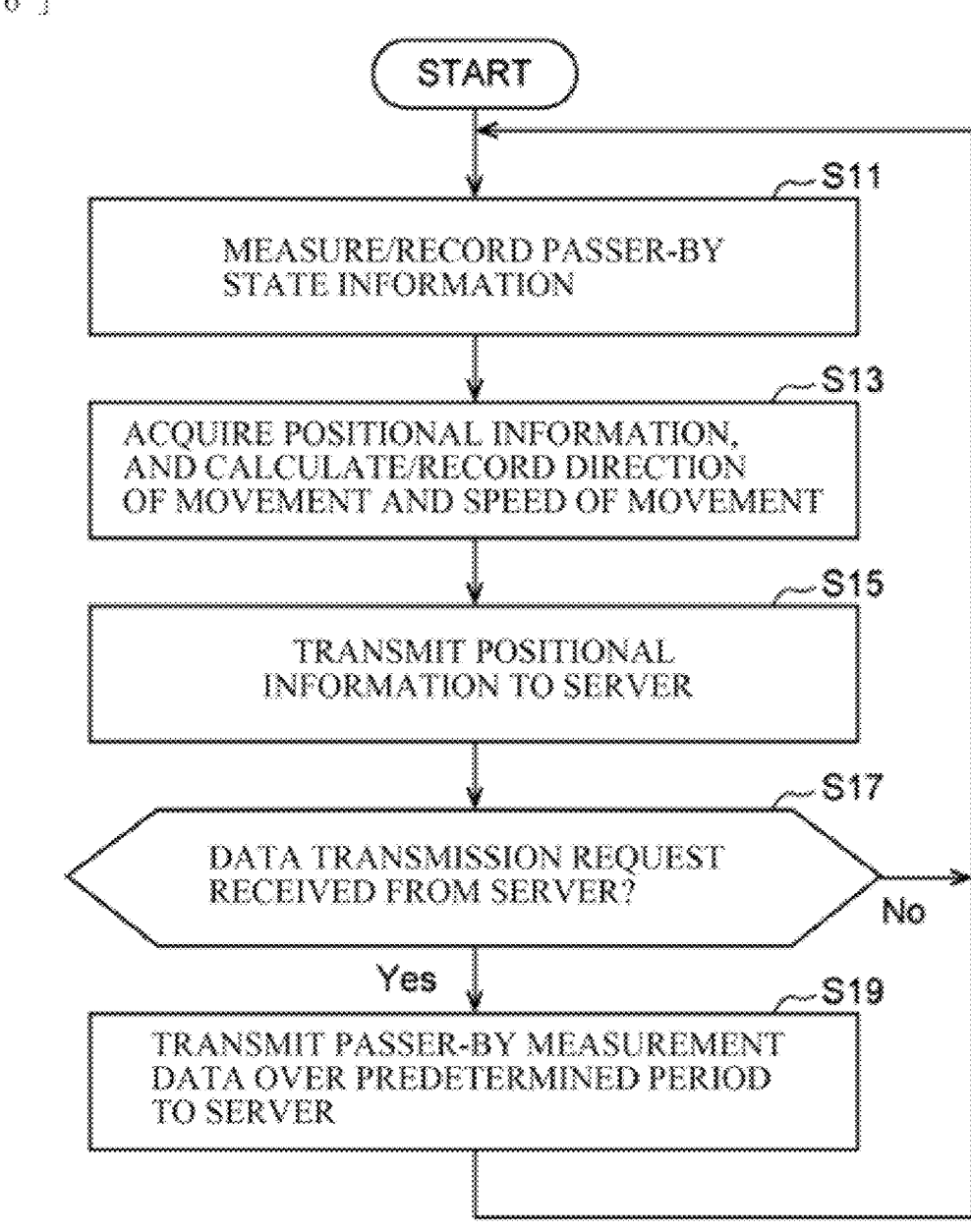

[ FIG. 7 ]
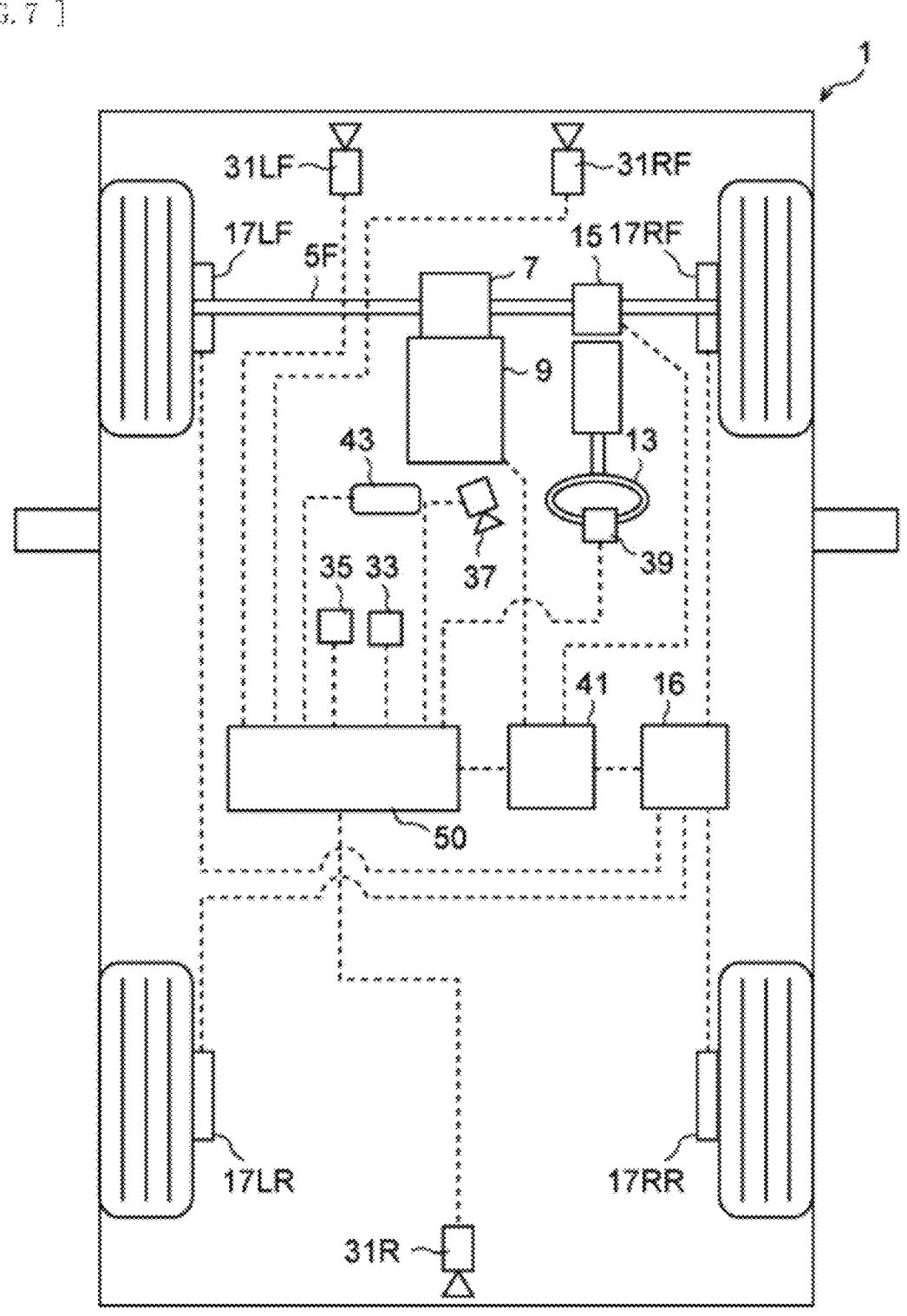

[ FIG. 8 ]
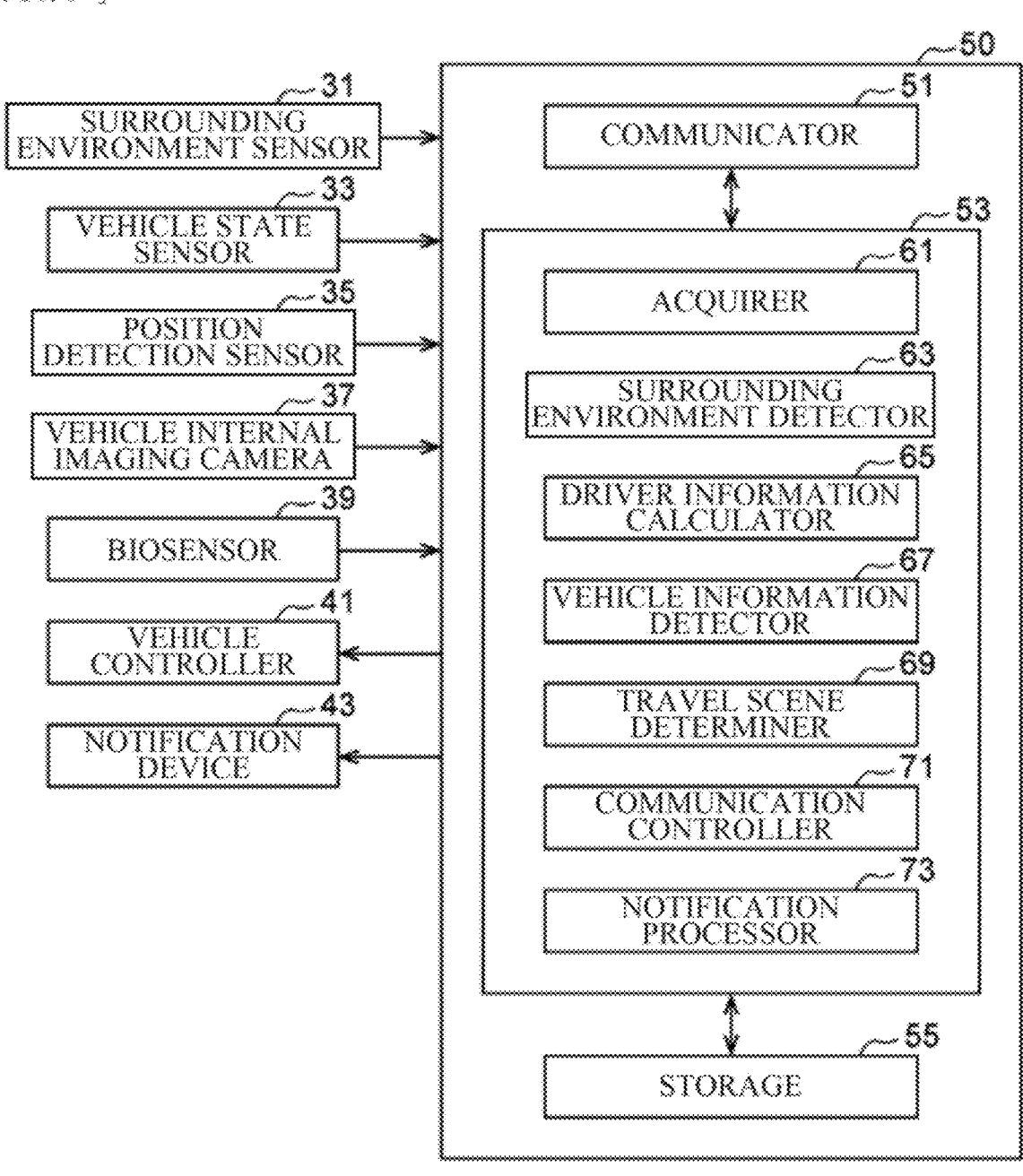

[ FIG. 9 ]
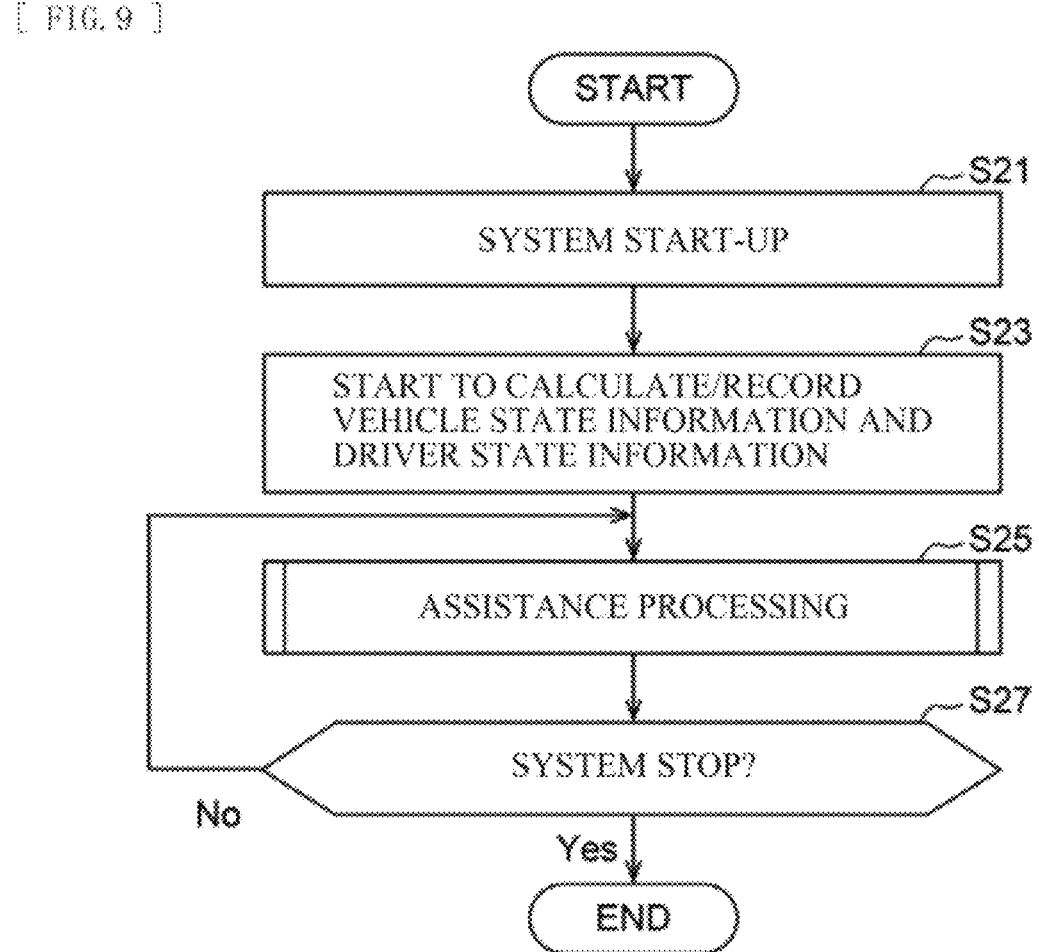

[ FIG. 10 ]
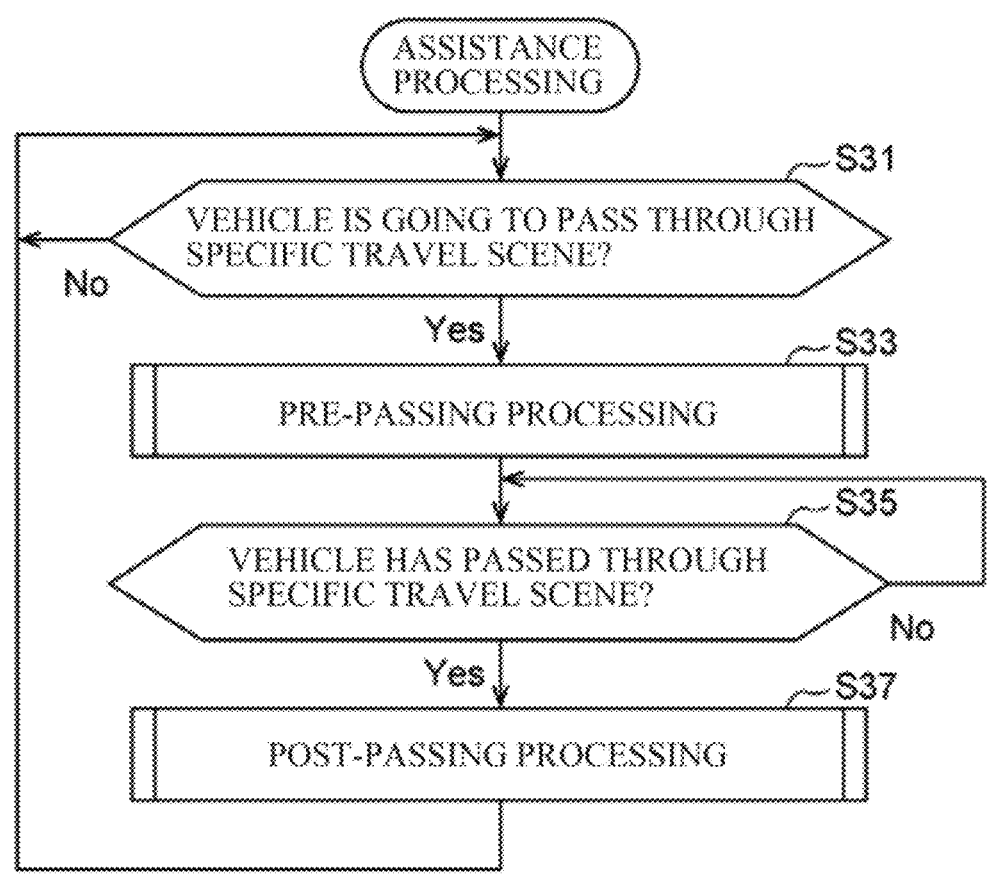
[ FIG. 11 ]
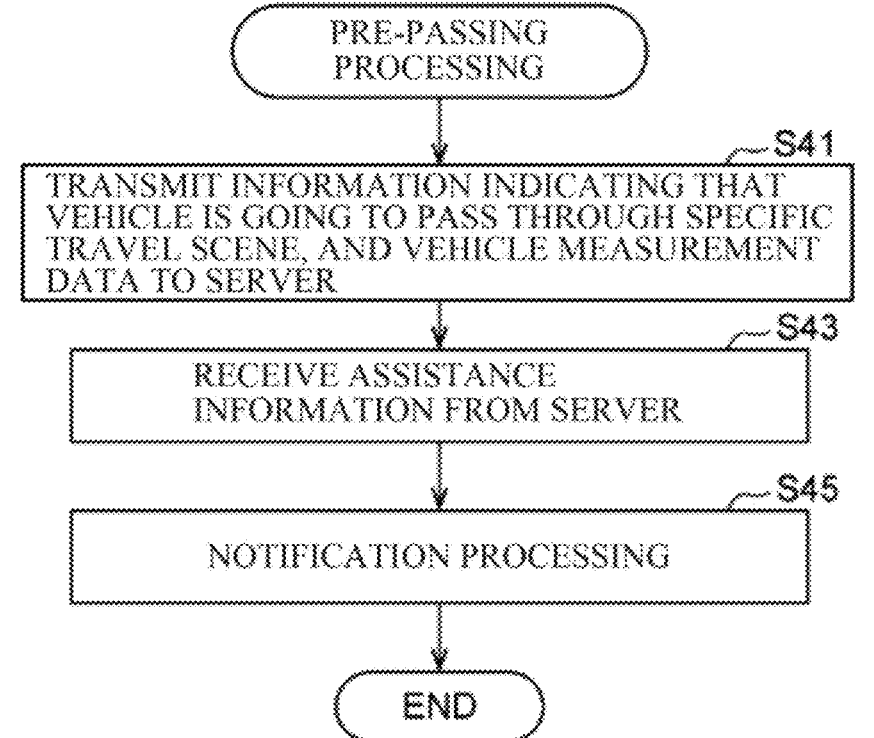

[ FIG. 12 ]
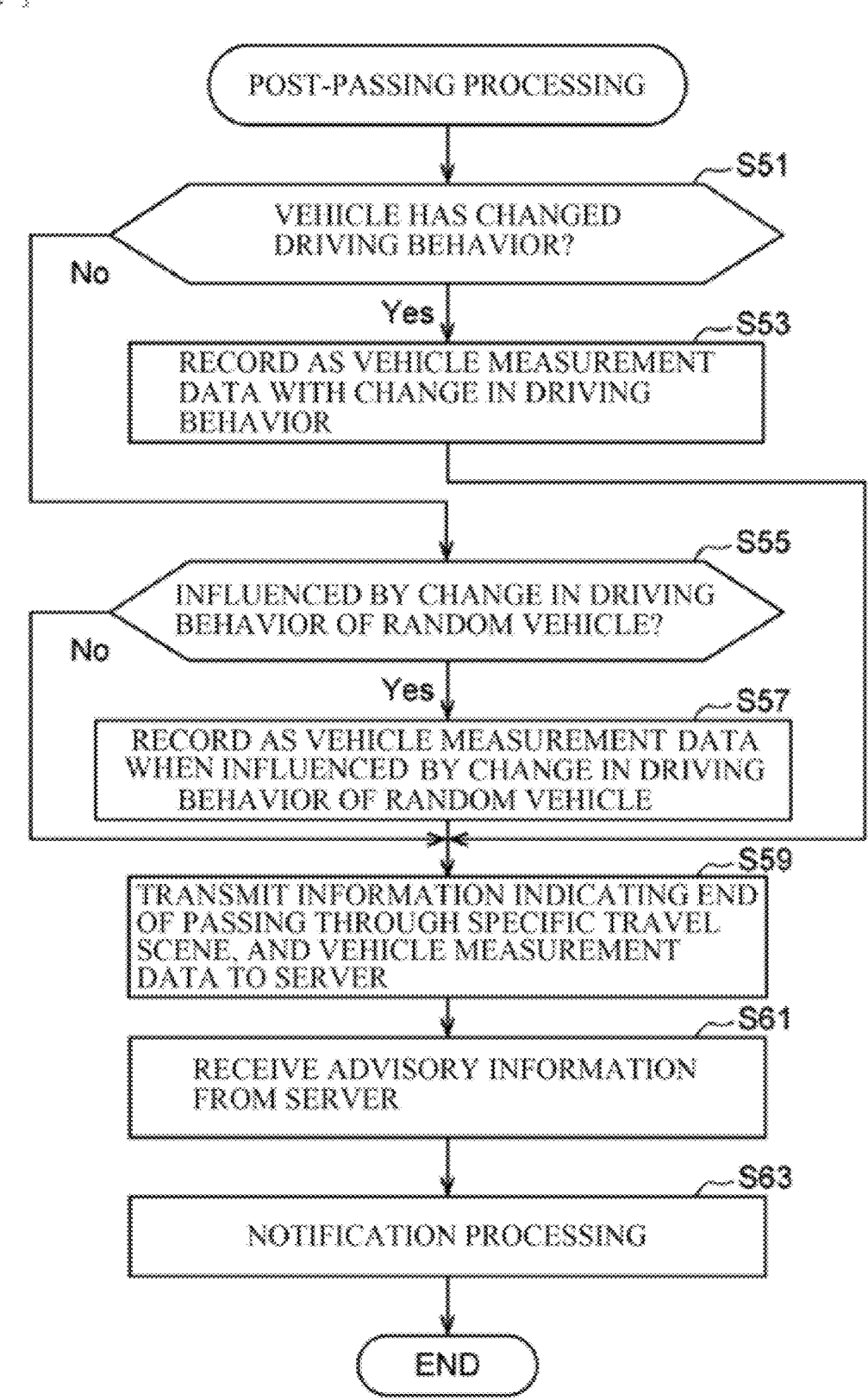

[ FIG. 13 ]
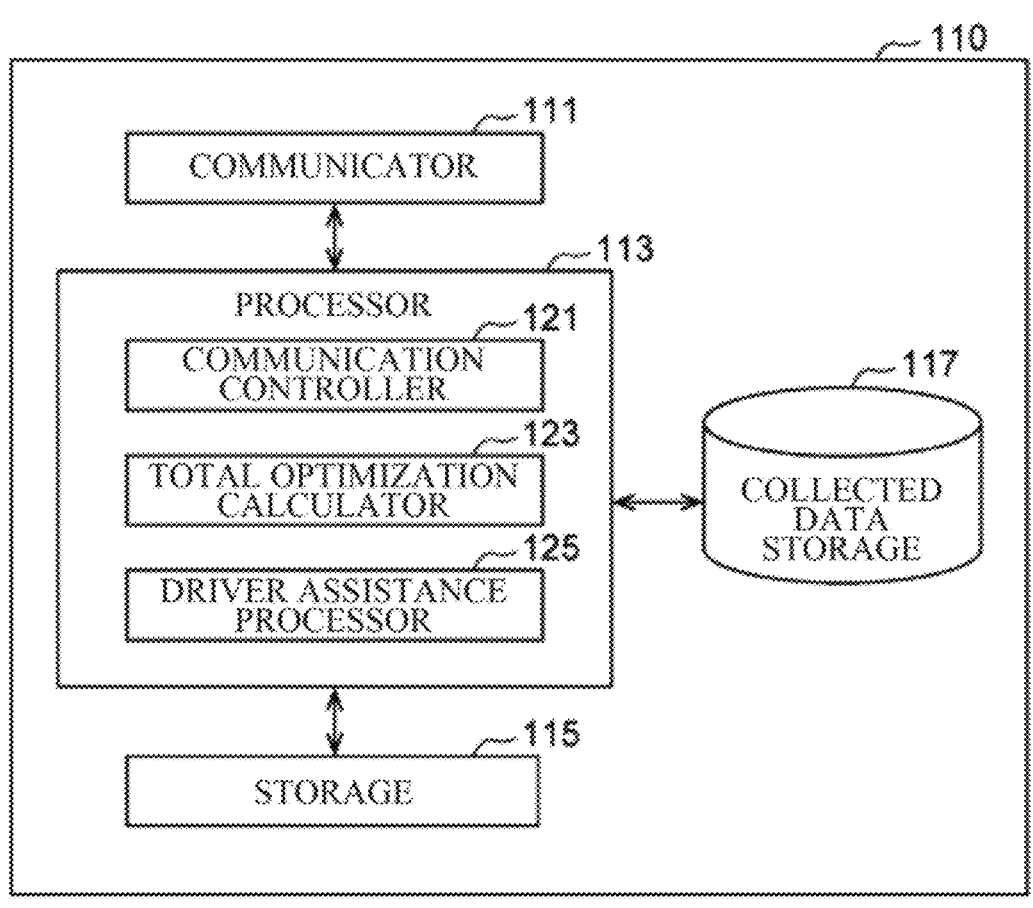

[ FIG. 14 ]
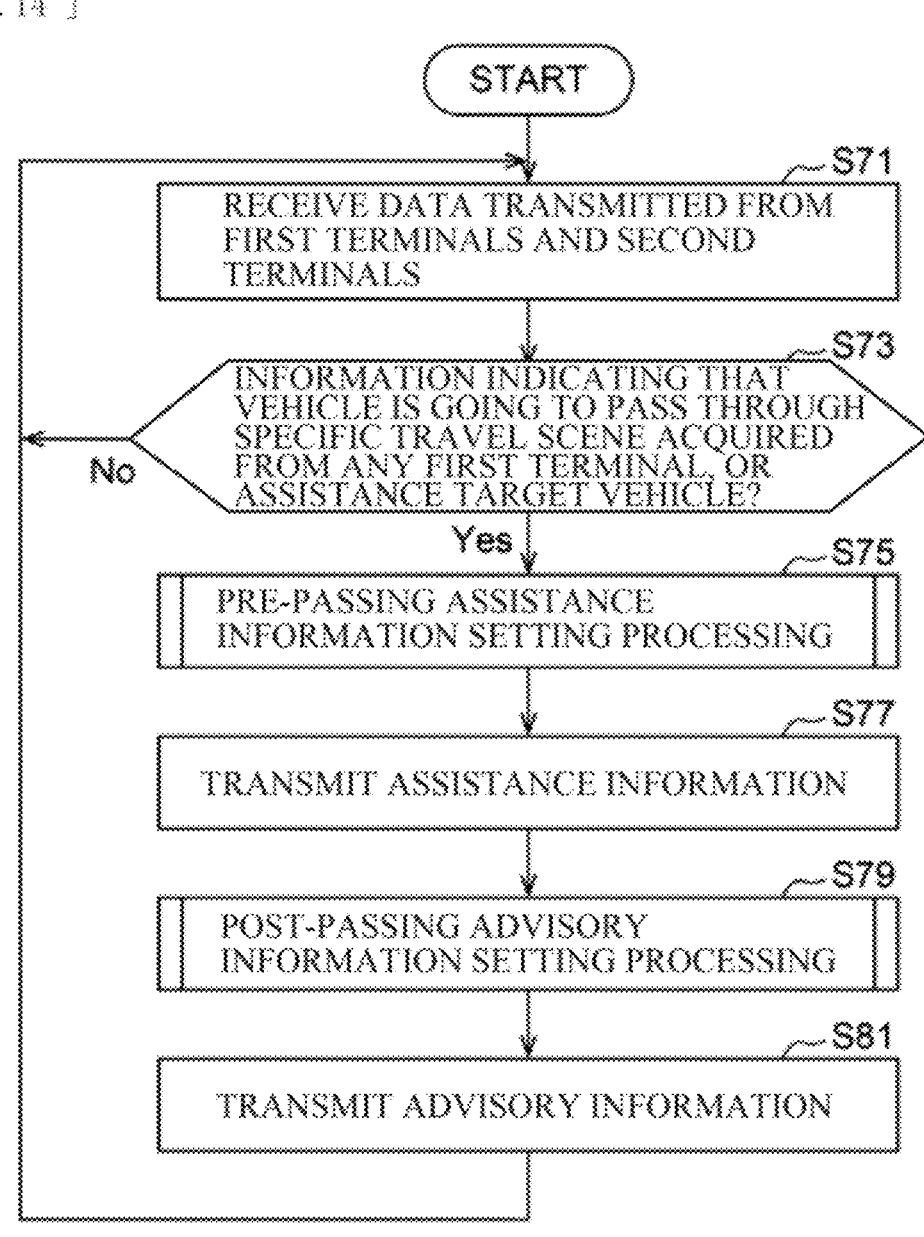

[ FIG. 15 ]

PRE-PASSING ASSISTANCE
INFORMATION SETTING PROCESSING

S91

IDENTIFY SURROUNDING TRAFFIC PARTICIPANTS BASED
ON POSITIONAL INFORMATION AND ACQUIRE VEHICLE
MEASUREMENT DATA AND PASSER-BY MEASUREMENT
DATA FROM EACH OF FIRST TERMINALS AND SECOND
TERMINALS

S93

EXTRACT VEHICLE MEASUREMENT DATA AND PASSER-BY
MEASUREMENT DATA REGARDING PREVIOUS PASSING
THROUGH SAME SPECIFIC TRAVEL SCENE, FROM DATA
HELD IN COLLECTED DATA STORAGE

S95

CALCULATE FIRST MENTAL STATE VALUE, FIRST
PHYSICAL LOAD STATE VALUE, AND FIRST ENERGY
STATE VALUE WITH CHANGE IN DRIVING BEHAVIOR OF
ASSISTANCE TARGET VEHICLE IN SPECIFIC TRAVEL SCENE

S97

CALCULATE SECOND MENTAL STATE VALUE, SECOND
PHYSICAL LOAD STATE VALUE, AND SECOND ENERGY
STATE VALUE WITHOUT CHANGE IN DRIVING BEHAVIOR
OF ASSISTANCE TARGET VEHICLE IN SPECIFIC TRAVEL
SCENE

S99

CALCULATE TOTAL OPTIMIZATION EVALUATION VALUES
BASED ON FIRST MENTAL STATE VALUE, FIRST PHYSICAL
LOAD STATE VALUE, AND FIRST ENERGY STATE VALUE,
AND SECOND MENTAL STATE VALUE, SECOND PHYSICAL
LOAD STATE VALUE, AND SECOND ENERGY STATE VALUE

S101

SET RECOMMENDED DRIVING BEHAVIOR BASED
ON TOTAL OPTIMIZATION EVALUATION VALUES

END

[ FIG. 16 ]
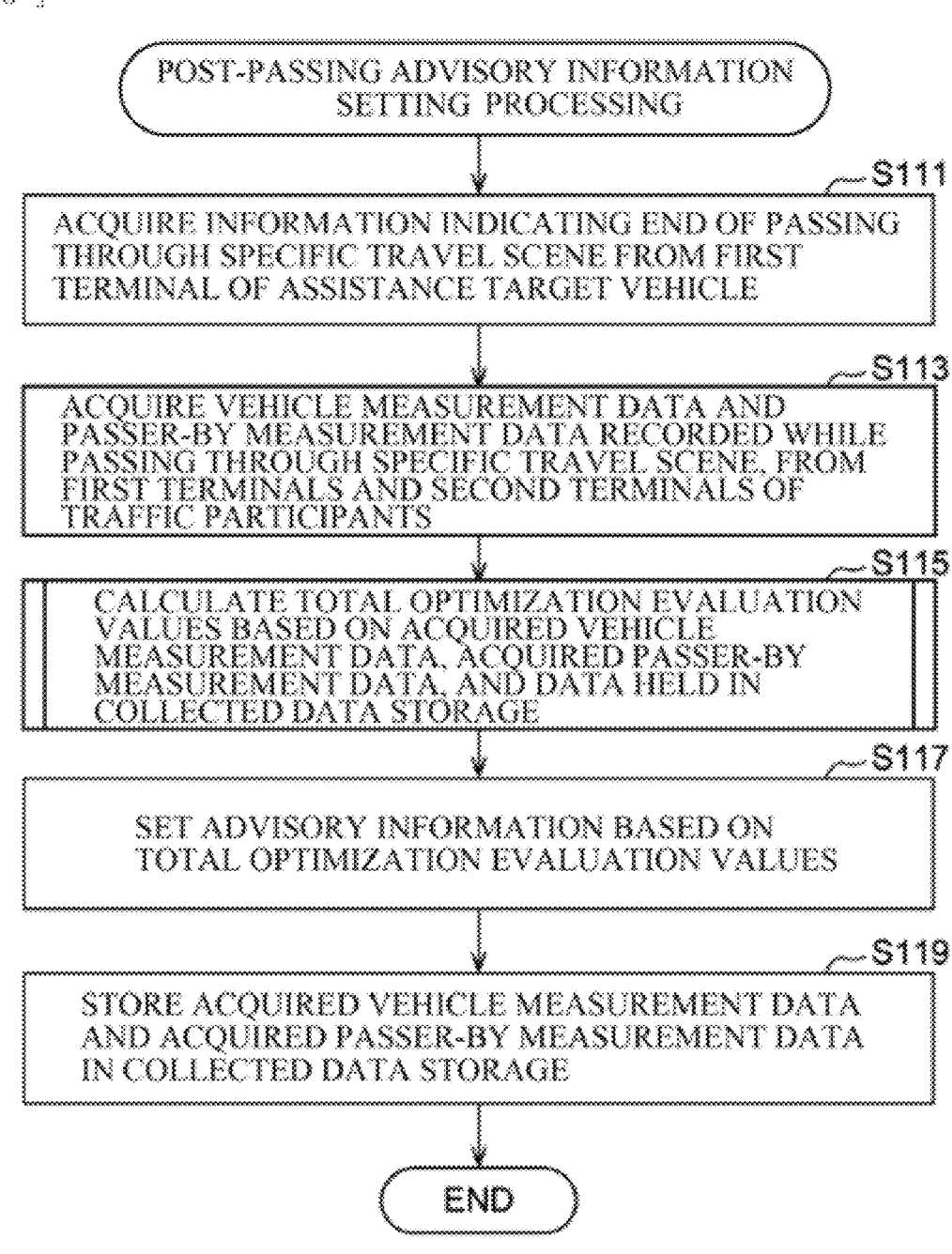

[ FIG. 17 ]
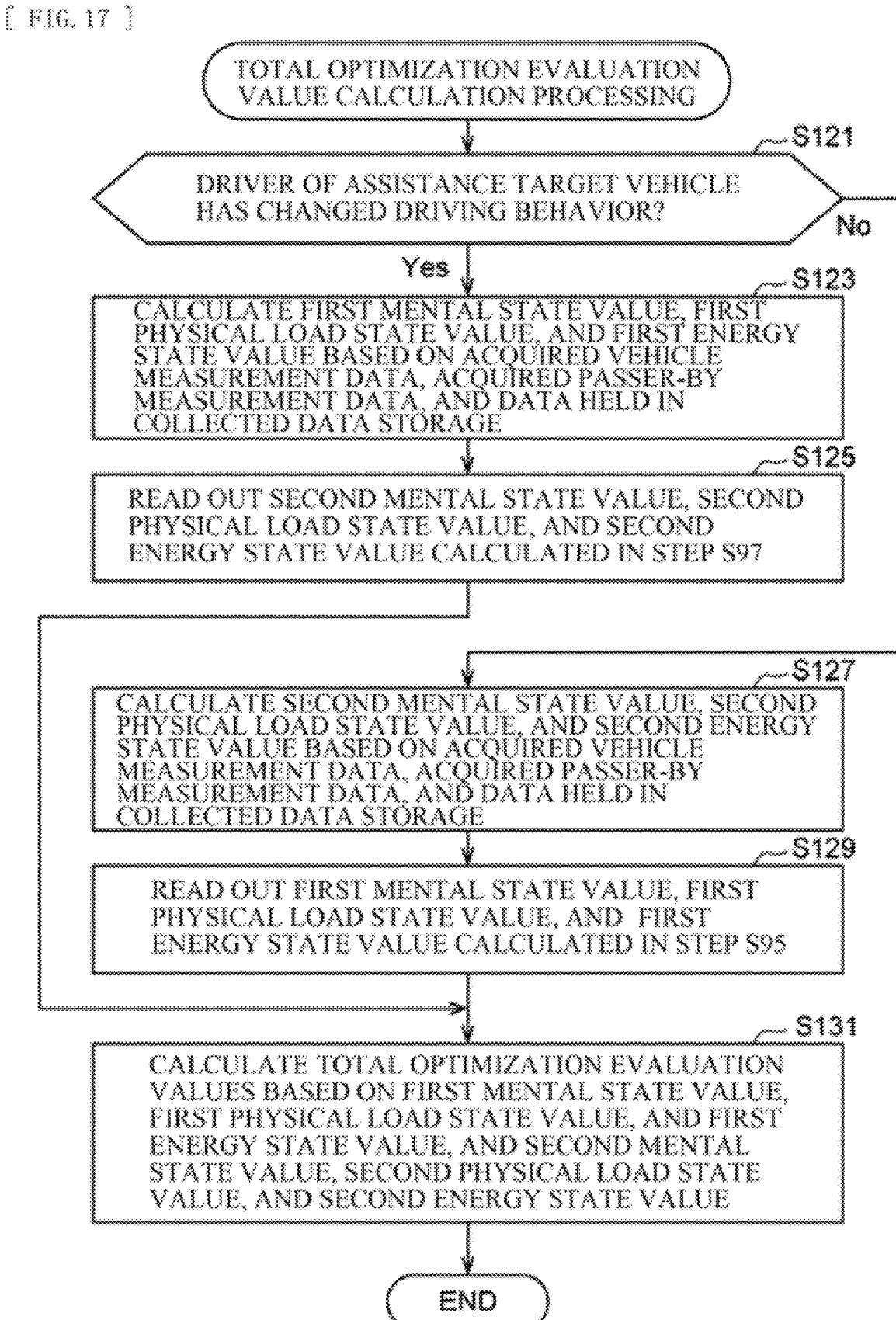

[ FIG. 18 ]
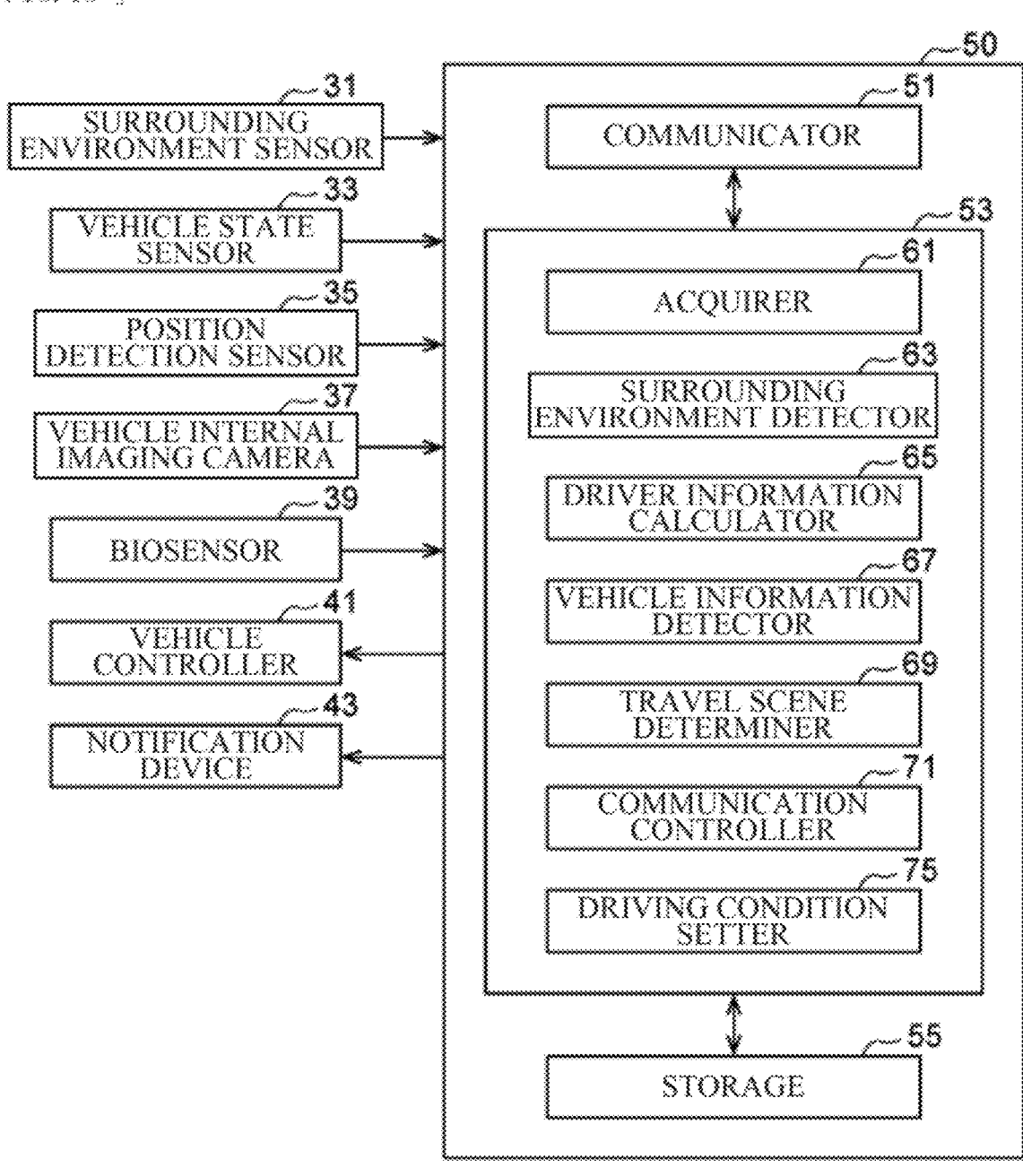

[ FIG. 19 ]
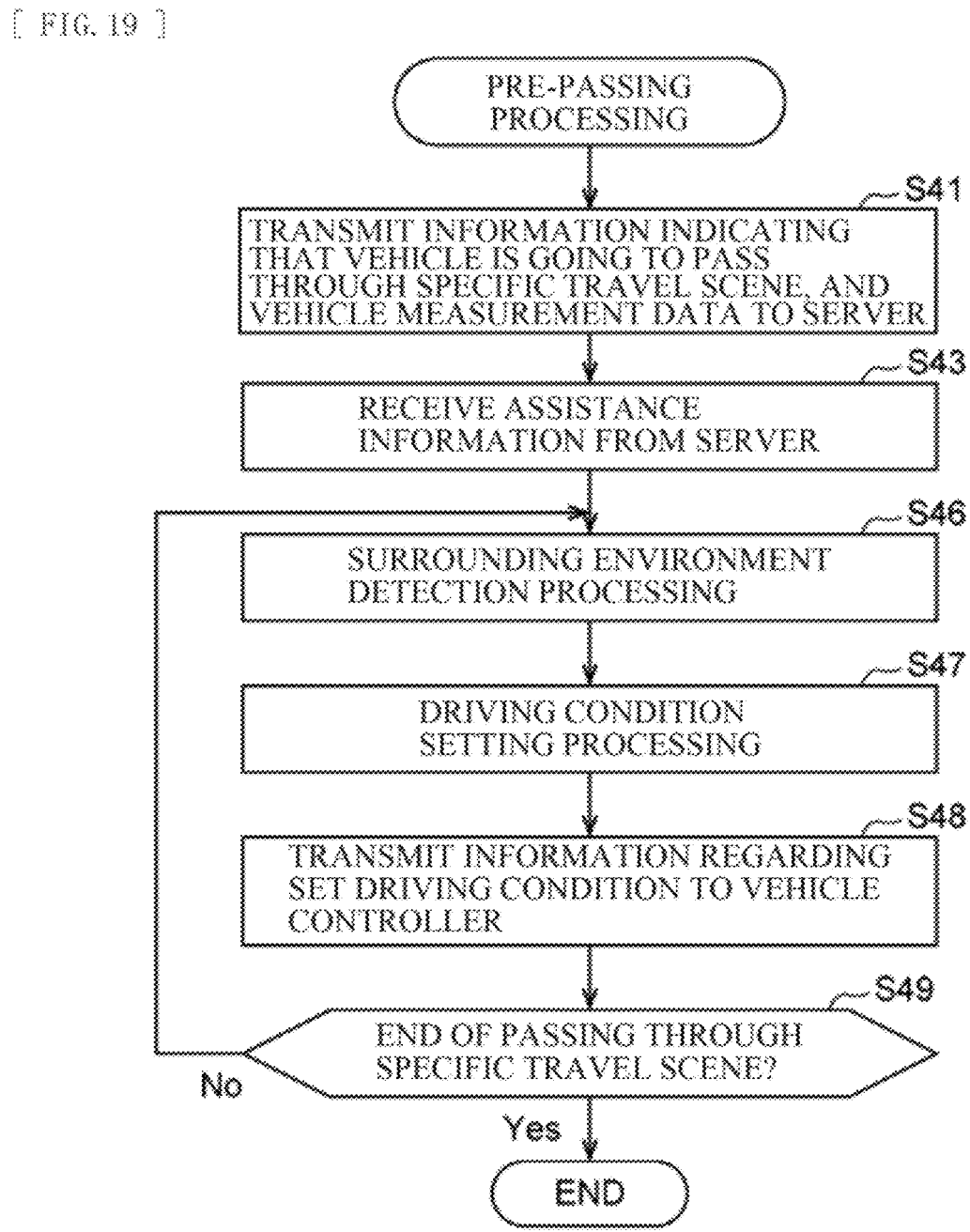

DRIVER ASSISTANCE SYSTEM AND DRIVER ASSISTANCE PROCESSING METHOD, AND RECORDING MEDIUM

CROSS-REFERENCE TO RELATED APPLICATIONS

This application is continuation of International Application No. PCT/JP2023/021651, filed on Jun. 12, 2023, the entire contents of which are hereby incorporated by reference.

BACKGROUND

The disclosure relates to a driver assistance system and a driver assistance processing method, and a recording medium.

In a scene in which multiple participants are involved, there is a concept of total optimization (Total Optimization) indicating an optimum state as states of the entire participants. This concept of total optimization is also applicable to a traffic environment in which multiple traffic participants are involved.

For example, in Japanese Unexamined Patent Application Publication (JP-A) No. 2019-117142, a proposal is made for an environment adjustment system in which each user achieves their purposes while attaining optimization of the entire environment to which the user belong. Specifically, JP-A No. 2019-117142 discloses the environment adjustment system including an acquirer, a planner, a transmitter, and a checker. The acquirer acquires environment information regarding an environment related to a user. The planner plans an action plan to be recommended to the user based on the environment information. The transmitter transmits the action plan to a terminal of the user. The checker checks whether the user has performed the action plan. When the planner creates a new action plan for another user or the user, the planner creates the plan by using a result of the check by the checker.

Moreover, in JP-A No. 2017-59099, a proposal is made for a technique to optimize an entire situation of actions of a large number of users. Specifically, JP-A No. 2017-59099 discloses an action control system including a contents providing means, a checking means, and a contents effect determining means. The contents providing means transmits contents to terminal devices of some users to prompt the users to change their actions. The checking means checks whether the user who has received the provision of the contents has actually changed the action in accordance with the contents. The contents effect determining means determines a characteristic and/or a state of the user who is likely to accept the contents based on a result of the check by the checking means and the characteristic and/or the state of the user held in a database, and records a result of the determination in the database. Next time the contents providing means provides the contents, the contents providing means determines which user to select as a destination of the provision of the contents based on the result of the determination held in the database.

SUMMARY

An aspect of the disclosure provides a driver assistance system configured to assist in driving vehicles. The driver assistance system includes: a collected data storage configured to hold vehicle measurement data transmitted from first terminals respectively mounted on the vehicles, and including driver state information regarding load states of drivers of the vehicles measured in a predetermined specific travel scene set in advance, and passer-by measurement data transmitted from second terminals respectively carried by passers-by, and including passer-by state information regarding load states of the passers-by measured in the predetermined specific travel scene; and a processor configured to carry out processing to assist in driving an assistance target vehicle of the vehicles based on the collected vehicle measurement data and the collected passer-by measurement data. The processor is configured to carry out total optimization calculation processing to calculate, based on the vehicle measurement data and the passer-by measurement data, a first load state value with a change in driving behavior of a driver of the assistance target vehicle in the predetermined specific travel scene and a second load state without the change in the driving behavior of the driver of the assistance target vehicle in the predetermined specific travel scene, and calculate a total optimization evaluation value based on a difference between the first load state value and the second load state value, the first load state value and the second load state value being load state values indicating a change in each of the load states of the drivers of random vehicles and the passers-by present in the predetermined specific travel scene while the assistance target vehicle is traveling through the predetermined specific travel scene, and the total optimization evaluation value indicating an influence of the driving behavior of the assistance target vehicle on total optimization, and driver assistance processing to assist in driving the assistance target vehicle based on the total optimization evaluation value.

An aspect of the disclosure provides a driver assistance processing method to assist in driving vehicles. The driver assistance method includes causing a computer to: based on vehicle measurement data transmitted from first terminals respectively mounted on the vehicles, and including driver state information regarding load states of drivers of the vehicles measured in a predetermined specific travel scene set in advance, and passer-by measurement data transmitted from second terminals respectively carried by passers-by, and including passer-by state information regarding load states of the passers-by measured in the predetermined specific travel scene, calculate a first load state value with a change in driving behavior of a driver of an assistance target vehicle of the vehicles in the predetermined specific travel scene and a second load state without the change in the driving behavior of the driver of the assistance target vehicle in the predetermined specific travel scene, and calculate a total optimization evaluation value based on a difference between the first load state value and the second load state value, the first load state value and the second load state value being load state values indicating a change in each of the load states of the drivers of random vehicles and the passers-by present in the predetermined specific travel scene while the assistance target vehicle is traveling through the predetermined specific travel scene, and the total optimization evaluation value indicating an influence of the driving behavior of the assistance target vehicle on total optimization, and assist in driving the assistance target vehicle based on the total optimization evaluation value.

An aspect of the disclosure provides a non-transitory tangible recording medium containing a computer program. The computer program causes a computer to: based on vehicle measurement data transmitted from first terminals respectively mounted on vehicles, and including driver state information regarding load states of drivers of the vehicles measured in a predetermined specific travel scene set in advance, and passer-by measurement data transmitted from second terminals respectively carried by passers-by, and including passer-by state information regarding load states of the passers-by measured in the predetermined specific travel scene, calculate a first load state value with a change in driving behavior by a driver of an assistance target vehicle of the vehicles in the predetermined specific travel scene and a second load state without the change in the driving behavior by the driver of the assistance target vehicle in the predetermined specific travel scene, and calculate a total optimization evaluation value based on a difference between the first load state value and the second load state value, the first load state value and the second load state value being load state values indicating a change in each of the load states of the drivers of random vehicles and the passers-by present in the predetermined specific travel scene while the assistance target vehicle is traveling through the predetermined specific travel scene, and the total optimization evaluation value indicating an influence of the driving behavior of the assistance target vehicle on total optimization, and assist in driving the assistance target vehicle based on the total optimization evaluation value.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIG. 1 is a schematic diagram illustrating a basic configuration of a driver assistance system according to an embodiment of the disclosure.

FIG. 2 is an illustrative diagram illustrating an example of a specific travel scene in which driving behavior of a vehicle influences total optimization.

FIG. 3 is an illustrative diagram illustrating another example of the specific travel scene in which the driving behavior of the vehicle influences the total optimization.

FIG. 4 is an illustrative diagram illustrating another example of the specific travel scene in which the driving behavior of the vehicle influences the total optimization.

FIG. 5 is a block diagram illustrating a configuration example of a mobile terminal of the driver assistance system according to the embodiment.

FIG. 6 is a flowchart illustrating processing operation by the mobile terminal of the driver assistance system according to the embodiment.

FIG. 7 is a schematic diagram illustrating a configuration example of a vehicle to which the driver assistance system according to the embodiment is applicable.

FIG. 8 is a block diagram illustrating a configuration example of a driver assistance apparatus of the driver assistance system according to the embodiment.

FIG. 9 is a flowchart illustrating a main routine of processing operation by the driver assistance apparatus of the driver assistance system according to the embodiment.

FIG. 10 is a flowchart illustrating assistance processing by the driver assistance apparatus of the driver assistance system according to the embodiment.

FIG. 11 is a flowchart illustrating pre-passing processing by the driver assistance apparatus of the driver assistance system according to the embodiment.

FIG. 12 is a flowchart illustrating post-passing processing by the driver assistance apparatus of the driver assistance system according to the embodiment.

FIG. 13 is a block diagram illustrating a configuration example of a management server of the driver assistance system according to the embodiment.

FIG. 14 is a flowchart illustrating processing operation by the management server of the driver assistance system according to the embodiment.

FIG. 15 is a flowchart illustrating pre-passing assistance information setting processing by the management server of the driver assistance system according to the embodiment.

FIG. 16 is a flowchart illustrating post-passing advisory information setting processing by the management server of the driver assistance system according to the embodiment.

FIG. 17 is a flowchart illustrating total optimization evaluation value calculation processing by the management server according to the embodiment.

FIG. 18 is a block diagram illustrating a configuration example of a driver assistance apparatus of a driver assistance system according to an embodiment of the disclosure.

FIG. 19 is a flowchart illustrating pre-passing processing by the driver assistance apparatus of the driver assistance system according to the embodiment.

DETAILED DESCRIPTION

In a traffic environment in which multiple traffic participants such as other vehicles, pedestrians, and bicycles are involved, it is possible to avoid traffic troubles by taking altruistic driving behavior that does not impose loads on other traffic participants. When such altruistic driving behavior is regarded as total optimized behavior that optimizes a total situation of the surrounding traffic participants, it is conceivable that elements related to the total optimization include at least mental loads on drivers of vehicles and physical loads on the drivers. Furthermore, when there are pedestrians or bicycle users in the traffic environment, it is conceivable that mental loads and physical loads on the pedestrians and the bicycle users are also related to the total optimization.

However, in the techniques disclosed in JP-A Nos. 2019-117142 and No. 2017-59099, although alleviation of traffic congestion and optimization of energy supply are taken into consideration as the optimization of the entire environment, the mental loads and the physical loads on the drivers of the vehicles, the pedestrians, and the bicycle users are not taken into consideration. Accordingly, the techniques disclosed in JP-A Nos. 2019-117142 and No. 2017-59099 fail in realizing total optimized driving that does not stimulate other traffic participants.

Moreover, in the techniques disclosed in JP-A Nos. 2019-117142 and No. 2017-59099, although a difference between driving behavior that has been planned and driving behavior that has been taken is taken into consideration with respect to automated driven vehicles, no attention is paid to a difference in an influence on the total optimization between a case with a change in the driving behavior of the driver and a case without the change in the driving behavior of the driver. For example, in a scene where there is a pedestrian approaching a crosswalk, if we know how much the total optimization is enhanced in a scene where a straight traveling vehicle passes through the crosswalk without decelerating and a scene where the vehicle decelerates short of the crosswalk, it would be possible to offer appropriate driving behavior to a driver of the vehicle.

The disclosure has been made in view of the problem mentioned above, and a purpose of the disclosure lies in providing a driver assistance system and a driver assistance method, and a recording medium that assist in realizing total optimized driving without imposing loads on other traffic participants.

In the following, some embodiments of the disclosure are described in detail with reference to the accompanying drawings. It is to be noted that throughout the present description and the drawings, elements having substantially the same function and configuration are denoted with the same reference numerals to avoid any redundant description.

It is to be noted that, in the embodiments described below, a "specific travel scene" refers to a travel scene defined in advance as a travel scene in which driving behavior of a vehicle influences total optimization of surrounding traffic participants. The "specific travel scene" may be defined in advance at a design stage of a system or may be optionally defined by a user of the vehicle.

A "passer-by" refers to not only a pedestrian but also a person other than an occupant of a vehicle, e.g., a bicycle user. A "traffic participant" refers to a vehicle and a passer-by present in a specific travel scene, and includes not only other vehicles but also an assistance target vehicle. Moreover, a "surrounding traffic participant" refers to a traffic participant present around a vehicle (assistance target vehicle) out of traffic participants, with reference to the vehicle (assistance target vehicle). A "first terminal" refers to a driver assistance apparatus mounted on a vehicle participating in the system. A "second terminal" refers to a mobile terminal carried by a passer-by participating in the system.

A "load state of a passer-by" and a "load state of a driver" each indicate one or both states of a mental load and a physical load.

A "mental state of a passer-by" and a "mental state of a driver" indicate a state of the mental load, and are classified into 11 stages, for example, from minus 5 to plus 5. As the mental state takes a positive value of a larger absolute value, the mental state indicated is a more positive mental state. It is conceivable that the "mental state of the passer-by" and the "mental state of the driver" change to a negative mental state when, for example, driving behavior of a vehicle is contrary to traffic rules or traffic manners, or the driving behavior of the vehicle is driving behavior that makes someone feel dangerous. Moreover, it is conceivable that the "mental state of the passer-by" and the "mental state of the driver" change to the positive mental state when, for example, the driving behavior of the vehicle is driving behavior that gives priority to other vehicles or passers-by.

A "physical load on a passer-by" and a "physical load on a driver" are expressed as, for example, an amount of calorie consumption per unit time. As the physical load takes a positive value of a larger absolute value, the physical load indicated is a larger value. It is conceivable that the "physical load on the passer-by" increase when a sudden avoidance action becomes necessary under an influence of, for example, driving behavior of a vehicle. Moreover, it is conceivable that the "physical load on the driver" increase when the driver steps down a brake pedal for deceleration or turns a steering wheel for a lane change.

1. First Embodiment

<1-1. Overview of Driver Assistance System>

Description is given first of an example of an overview of a driver assistance system according to an embodiment of the disclosure.

FIG. 1 is an illustrative diagram illustrating an example of a basic configuration of a driver assistance system 100.

The driver assistance system 100 includes first terminals (driver assistance apparatuses) 50, second terminals (mobile terminals) 130, and a management server 110. The first terminals (driver assistance apparatuses) 50 are mounted on respective vehicles 1. The second terminals (mobile terminals) 130 are carried by one or more passers-by H. The number of the vehicles 1 and the passers-by H participating in the driver assistance system 100 take any values, and there is no particular limitation thereon. Moreover, although the single management server 110 is illustrated for ease of understanding, a plurality of the management servers 110 may be provided.

The driver assistance apparatuses 50 and the mobile terminals 130 are each communicatably coupled to the management server 110 through one or more communication networks 105. For example, the driver assistance apparatuses 50 and the mobile terminals 130 are coupled to the management server 110 through a mobile communication network.

The mobile terminal 130 is, for example, a smartphone, a smartwatch, or other wearable devices. The mobile terminal 130 detects positional information regarding the mobile terminal 130 on predetermined processing cycles, and obtains, by calculation, a direction of movement and a speed of movement of the mobile terminal 130 based on a temporal change in a position of the mobile terminal 130. Moreover, the mobile terminal 130 measures passer-by state information regarding one or both of a mental state of, and a physical load on, the passer-by H carrying the mobile terminal 130.

The mobile terminal 130 is configured to transmit, to the management server 110, information regarding the position, the direction of movement, and the speed of movement of the mobile terminal 130, and the passer-by state information, together with identification information identifying the mobile terminal 130. In the embodiment, the identification information regarding the mobile terminal 130, the information regarding the position, the direction of movement, and the speed of movement of the mobile terminal 130, and the passer-by state information correspond to passer-by measurement data.

The driver assistance apparatus 50 is mounted on the vehicle 1 participating in the system, detects positional information regarding the vehicle 1 on the predetermined processing cycles, and obtains, by calculation, a direction of movement of the vehicle 1 based on a temporal change in a position of the vehicle 1. Moreover, the driver assistance apparatus 50 measures a travel state and an amount of energy consumption of the vehicle 1, and accumulates them as time-series data. Furthermore, the driver assistance apparatus 50 detects driver state information regarding one or both of a mental state of, and a physical load on, a driver of the vehicle.

The driver assistance apparatus 50 is configured to transmit, to the management server 110, the positional information regarding the vehicle 1, the information regarding the direction of movement and the travel state of the vehicle 1, and the driver state information, together with identification information identifying the driver. In the embodiment, the identification information regarding the driver, the positional information regarding the vehicle 1, the information regarding the direction of movement, the amount of energy consumption, and the travel state of the vehicle 1, and the driver state information correspond to the vehicle measurement data. It is to be noted that, in the following, the positional information regarding the vehicle 1 and the information regarding the direction of movement and the travel state of the vehicle 1 are sometimes collectively referred to as "vehicle state information".

Moreover, the driver assistance apparatus 50 acquires notification information to assist in driving the vehicle 1 from the management server 110, and notifies the driver of the vehicle 1 of the acquired notification information. In the embodiment, the driver assistance apparatus 50 acquires the notification information from the management server 110 before and after the vehicle 1 passes through a predetermined specific travel scene, and notifies the driver of the acquired notification information.

The management server 110 is an information processor communicatably coupled to the mobile terminal 130 and the driver assistance apparatus 50 through the communication network 105 by, for example, cloud computing technology. The management server 110 receives the vehicle measurement data from the driver assistance apparatus 50. The vehicle measurement data to be received includes information indicating that the vehicle 1 passes through the predetermined specific travel scene. The management server 110 identifies the mobile terminal 130 present in a predetermined area corresponding to the position of the vehicle 1 passing through the specific travel scene, and transmits a message of a data transmission request to the relevant mobile terminal 130.

Moreover, the management server 110 identifies a random vehicle present in the predetermined area corresponding to the position of the vehicle 1 passing through the specific travel scene, and identifies the vehicle measurement data received from the relevant random vehicle. The management server 110 sets the notification information to assist in driving the assistance target vehicle 1, based on the vehicle measurement data and the passer-by measurement data acquired from the surrounding traffic participants present in the specific travel scene, and transmits the notification information to the driver assistance apparatus 50 of the vehicle 1.

FIGS. 2 to 4 are illustrative diagrams illustrating examples of the specific travel scene in which driving behavior of a vehicle influences total optimization.

FIG. 2 illustrates a scene in which three vehicles 200*a* to 200*c* are traveling toward a crosswalk from the right, a vehicle 200*d* is traveling toward the crosswalk from the left, and furthermore, a pedestrian 202 is approaching the crosswalk. The specific travel scene in FIG. 2 is defined as, for example, a "travel scene of passing through a crosswalk without a traffic signal".

In the example illustrated in FIG. 2, when the vehicle 200*d* decelerates in consideration of crossing of the pedestrian 202, if the vehicle 200*a* also decelerates or stops, it is possible to promote smooth crossing of the pedestrian 202. In this case, at least a driver of the vehicle 202*d* and the pedestrian 202 possibly changes to a positive mental state. However, when the vehicle 200*a* decelerates rapidly, it is conceivable that drivers of the vehicles 200*b* and 200*c* change to a negative mental state, or the physical loads on the drivers of the following vehicles 200*a* to 200*c* increase. Meanwhile, when the vehicle 200*a* continues traveling without decelerating, it is conceivable that the driver of the vehicle 202*d* and the pedestrian 202 change to the negative mental state. Moreover, when the pedestrian 202 has to stop suddenly short of the crosswalk under an influence of the vehicle 202*a* passing through the crosswalk, it is conceivable that the physical load on the pedestrian 202 increase.

FIGS. 3 and 4 are examples of the specific travel scene in which no passers-by are present, and illustrate a scene in which the vehicles 210*a* to 200*g* traveling in their respective travel zones merge at a merging point of lanes of a road including two lanes on each side. The specific travel scene in FIGS. 3 and 4 is defined as, for example, a "travel scene of passing through a merging point of lanes".

Among them, FIG. 3 illustrates "zipper merging" in which vehicles traveling in two travel zones merge one by one by mutual concessions at a leading point of merging. In the zipper merging, drivers of the vehicles 210*b* and 210*e* at the leading point of merging make lane changes by mutual concessions (change driving behavior), and merge. Meanwhile, FIG. 4 illustrates a state in which the vehicles 200*e* to 200*g* traveling in the travel zone on merging side cut in on the vehicles 200*a* to 200*d* traveling in the travel zone as a destination of merging at any spot short of the merging point. In the merging method in FIG. 4, drivers of the vehicles 210*a* to 210*g* decelerate or make lane changes (change the driving behavior) at appropriate positions, and the vehicles 200*a* to 200*g* merge.

The merging method illustrated in FIG. 3 is a merging method that does not stimulate the drivers of the respective vehicles 200*a* to 200*g* as compared with the merging method illustrated in FIG. 4. It is conceivable that the merging method illustrated in FIG. 3 does not change the mental state of the drivers of the vehicle 200*a* to 200*g* negatively. Moreover, in the merging method illustrated in FIG. 4, when the drivers of the vehicles 210*c* and 210*d* traveling in the travel zone as the destination of merging rapidly decelerate under an influence of cutting in of the vehicles 210*f* and 210*g*, it is conceivable that the physical loads on the drivers of the vehicles 210*c* and 210*d* increase.

The driver assistance system 100 according to the embodiment is constructed as a system that focuses on changes in the mental states of, and the physical loads on, surrounding traffic participants to be caused by the driving behavior of the vehicle traveling in the specific travel scene, and attains the total optimization in the specific travel scene.

In the following, detailed description is given of a functional configuration and operation of the mobile terminal 130, the driver assistance apparatus 50, and the management server 110. It is to be noted that, in the following description, for ease of understanding, a specific vehicle is referred to as the assistance target vehicle 1, and other vehicles than the assistance target vehicle 1 is referred to as random vehicles.

<1-2. Mobile Terminal >

First, the mobile terminal 130 is described in detail.

The mobile terminal 130 is a terminal device carried by the passer-by H. As described above, the passer-by H is not limited to a pedestrian, but may be a person other than an occupant of the vehicle 1, e.g., a bicycle user.

(1-2-1. Functional Configuration)

FIG. 5 is a block diagram illustrating a functional configuration of the mobile terminal 130.

The mobile terminal 130 includes a communicator 131, a processor 133, a storage 139, and a position detection sensor 141. The communicator 131 is an interface for communication with the management server 110 through the communication network 105. The position detection sensor 141 receives satellite signals transmitted from positioning satellites of a GNSS (Global Navigation Satellite System) typified by the GPS (Global Positioning System). The satellite signals include positional information indicating the position of the mobile terminal 130 on map data. For example, the positional information regarding the mobile terminal 130 is represented as longitude and latitude data. The position detection sensor 141 outputs the acquired positional information regarding the mobile terminal 130 to the processor 133.

The storage 139 includes one or more memories communicatably coupled to the processor 133, and holds a computer program to be executed by the processor 133, various parameters to be used in calculation processing, and information regarding calculation results. The storage 139 may be a storage element such as a RAM (Random Access Memory) and a ROM (Read Only Memory), and a flash memory such as an SSD (Solid State Drive), or any other recording medium.

The processor 133 includes one or more CPUs (Central Processing Unit). The processor 133 includes a data processor 135 and a communication controller 137. Functions of these units are realized by execution of a computer program by a processor. The data processor 135 obtains, by calculation, the speed of movement and the direction of movement of the mobile terminal 130 based on the positional information inputted from the position detection sensor 141 on the predetermined processing cycles. For example, the data processor 135 is configured to obtain, by calculation, the speed of movement and the direction of movement of the mobile terminal 130 based on a temporal change in the positional information inputted on the predetermined processing cycles.

Moreover, the data processor 135 measures one or both of the mental state of, and the physical load on, the passer-by H carrying the mobile terminal 130 based on information inputted from a biosensor 143 and a camera 145 on the predetermined processing cycles. The data processor 135 estimates the mental state of the passer-by H based on, for example, mimic muscles of the face of the passer-by H acquired from image data by the camera 145. The camera 145 that captures the face of the passer-by H may be a camera mounted on a smartphone, or may be a camera communicatably coupled to the mobile terminal 130 and attached to the passer-by H.

Furthermore, the data processor 135 estimates the physical load on the passer-by H based on, for example, a myoelectric potential signal outputted from the biosensor 143. The biosensor 143 to measure the physical load on the passer-by H may be a contact biosensor mounted on a smartphone, or may be a biosensor communicatably coupled to the mobile terminal 130 and attached to the passer-by H.

The communication controller 137 transmits, to the management server 110, the positional information regarding the mobile terminal 130 inputted from the position detection sensor 141, the information regarding the speed of movement and the direction of movement of the mobile terminal 130 obtained by the data processor 135, and the passer-by measurement data including the driver state information regarding one or both of the mental state of, and the physical load on, the passer-by H. In the embodiment, the communication controller 137 transmits the passer-by measurement data to the management server 110 upon receiving the data transmission request from the management server 110.

(1-2-2. Processing Operation)

Next, processing operation by the mobile terminal 130 is described in detail.

FIG. 6 illustrates a flowchart of the processing operations by the mobile terminal 130. The flowchart illustrated in FIG. 6 is executed constantly while the mobile terminal 130 participates in the system of the disclosure.

The data processor 135 of the processor 133 measures the passer-by state information and records the passer-by state information in the storage 139 (step S11). Specifically, the data processor 135 identifies the face of the passer-by H based on the image data generated by the camera 145, and estimates the mental state of the passer-by H based on the mimic muscles of the face. It is to be noted that when the face of the passer-by H is unidentifiable in the image data by the camera 145, the data processor 135 skips the estimation of the mental state of the passer-by H. Moreover, the data processor 135 calculates the physical load on the passer-by H based on the myoelectric potential signal outputted from the biosensor 143.

Next, the data processor 135 acquires the positional information regarding the mobile terminal 130 outputted from the position detecting sensor 141, calculates the direction of movement and the speed of movement of the mobile terminal 130, and records them in the storage 139 (step S13). Specifically, the data processor 135 obtains the speed of movement by time-differentiating a distance of movement based on the positional information inputted on the predetermined processing cycles. Moreover, the data processor 135 obtains a vector of movement (direction of movement) on the map data based on the positional information inputted on the predetermined processing cycles.

Next, the data processor 135 transmits the positional information together with the identification information regarding the mobile terminal 130 to the management server 110 (step S15). Next, the communication controller 137 determines whether the data transmission request has been received from the management server 110 (step S17). When the communication controller 137 does not determine that the data transmission request has been received from the management server 110 (S17/No), the flow returns to step S11, and the data processor 135 repeats the measurement and the recording of the passer-by state information and the acquisition and the transmission of the positional information.

Meanwhile, when the communication controller 137 determines that the data transmission request has been received from the management server 110 (S17/Yes), the communication controller 137 transmits the passer-by measurement data recorded over a predetermined period to the management server 110 (step S19). The passer-by measurement data includes the positional information regarding the mobile terminal 130, the information regarding the speed of movement and the direction of movement of the mobile terminal 130, and the passer-by state information. The data transmission request transmitted from the management server 110 includes information designating a period in which each piece of data is recorded. The designated period is designated as, for example, a period during which the assistance target vehicle passes through the specific travel scene. The communication controller 137 extracts data recorded in the designated period from each piece of data held in the storage 139, and transmits the extracted data to the management server 110.

The mobile terminal 130 repeatedly carries out the processes in steps S11 to S19 described above on the predetermined processing cycles.

<1-3. Driver Assistance Apparatus>

(1-3-1. Vehicle)

Next, before description of a functional configuration of the driver assistance apparatus 50, description is made of an example of an overall configuration of the vehicle 1 on which the driver assistance apparatus 50 is mounted. The driver assistance apparatus 50 may be mounted on all the vehicles 1 that participate in the system of the disclosure.

FIG. 7 is a schematic diagram illustrating a configuration example of the vehicle 1 including the driver assistance apparatus 50.

The vehicle 1 is configured as a two-wheel drive four-wheeled vehicle that transmits driving torque outputted from a driving force source 9 to a left front wheel and a right front wheel. The driving force source 9 generates the driving torque. The driving force source 9 may be an internal combustion engine such as a gasoline engine or a diesel engine, or may be a driving motor, or may include both an internal combustion engine and a driving motor.

It is to be noted that the vehicle 1 may be a four-wheel drive vehicle that transmits the driving torque to front wheels and rear wheels. Moreover, the vehicle 1 may be, for example, an electric vehicle including two driving motors, i.e., a front wheel driving motor and a rear wheel driving motor. The vehicle 1 may be an electric vehicle including driving motors corresponding to the respective wheels. Moreover, when the vehicle 1 is an electric vehicle or a hybrid electric vehicle, the vehicle 1 includes a secondary battery and a generator such as a motor or a fuel cell. The secondary battery accumulates electric power to be supplied to a driving motor. The generator generates electric power to be charged in the battery.

The vehicle 1 includes the driving force source 9, an electric steering device 15, and brake devices 17LF, 17RF, 17LR, and 17RR (hereinafter, collectively referred to as "brake devices 17" when distinction is not particularly necessary) as devices to be used for a driving control of the vehicle 1. The driving force source 9 outputs the driving torque to be transmitted to a front wheel drive shaft 5F through an unillustrated transmission and a differential mechanism 7. Driving of the driving force source 9 and the transmission is controlled by a vehicle controller 41 including one or more electronic control units (ECU: Electronic Control Unit).

The electric steering device 15 is provided on the front wheel drive shaft 5F. The electric steering device 15 includes an unillustrated electric motor and an unillustrated gear mechanism. The electric steering device 15 is controlled by the vehicle controller 41 to adjust steering angles of the front wheels. In manual driving, the vehicle controller 41 controls the electric steering device 15 based on a steering wheel angle of a steering wheel 13 by the driver. Moreover, in automated driving, the vehicle controller 41 controls the electric steering device 15 based on the set steering angle or a set steering angular speed.

The brake devices 17LF, 17RF, 17LR, and 17RR apply braking forces to the respective wheels. The brake devices 17 each include, for example, a hydraulic brake device. The vehicle controller 41 controls driving of a hydraulic unit 16 to control pressure to be supplied to each of the brake devices 17. When the vehicle 1 is an electric vehicle or a hybrid electric vehicle, the brake devices 17 are used in combination with a regenerative brake by a driving motor.

The vehicle controller 41 includes one or more electronic control units that control the driving of the driving force source 9, the electric steering device 15, and the hydraulic unit 16. When the vehicle 1 includes a transmission that performs shifting of an output outputted from the driving force source 9 and transmits the resultant output to the wheels 3, the vehicle controller 41 has a function of controlling the driving of the transmission.

Moreover, the vehicle 1 includes front imaging cameras 31LF and 31RF, a rear imaging camera 31R, a vehicle state sensor 33, a position detection sensor 35, a vehicle internal imaging camera 37, a biosensor 39, and a notification device 43.

The front imaging cameras 31LF and 31RF, and the rear imaging camera 31R constitute a surrounding environment sensor to acquire information regarding a surrounding environment of the vehicle 1. The front imaging cameras 31LF and 31RF captures a frontward image of the vehicle 1 and generates image data. The rear imaging camera 31R captures a rearward image of the vehicle 1 and generates image data. The front imaging cameras 31LF and 31RF, and the rear imaging camera 31R include an imaging element such as a CCD (Charged-Coupled Device) or CMOS (Complementary Metal-Oxide-Semiconductor). The front imaging cameras 31LF and 31RF, and the rear imaging camera 31R transmit the generated image data to the driver assistance apparatus 50. In the vehicle 1 illustrated in FIG. 7, the front imaging cameras 31LF and 31RF includes a stereo camera including a pair of right and left cameras. However, the front imaging camera may be a monocular camera.

It is to be noted that, in addition to the front imaging cameras 31LF and 31RF, and the rear imaging camera 31R, the surrounding environment sensor may include, for example, a camera provided on side mirrors. The camera captures a left rearward view or a right rearward view. In addition, the surrounding environment sensor may include any one or more sensors of LiDAR (Light Detection And Ranging), a radar sensor such as millimeter-wave radar, and an ultrasonic sensor.

The vehicle state sensor 33 includes one or more sensors that detect an operation state of behavior of the vehicle 1. The vehicle state sensor 33 includes one or more of, for example, a steering angle sensor, an accelerator position sensor, a brake stroke sensor, a brake pressure sensor, and an engine speed sensor. Moreover, the vehicle state sensor 33 includes one or more of, for example, a vehicle speed sensor, an acceleration rate sensor, and an angular speed sensor. Furthermore, the vehicle state sensor 33 includes a switch that detects on/off states of turn signal lamps. The vehicle state sensor 33 transmits a sensor signal indicating the detected information to the driver assistance apparatus 50.

The position detection sensor 35 receives the satellite signals from the positioning satellites of the GNSS typified by the GPS. The position detection sensor 35 transmits the positional information regarding the vehicle 1 included in the received satellite signals to the driver assistance apparatus 50. It is to be noted that, besides a GPS sensor, the position detection sensor 35 may be an antenna that receives satellite signals from other satellite systems that identify the position of the vehicle 1.

The vehicle internal imaging camera 37 captures the driver of the vehicle 1 and generates image data. The vehicle internal imaging camera 37 includes an imaging element such as the CCD and the CMOS and transmits the generated image data to the driver assistance apparatus 50.

The biosensor 39 includes one or more sensors that detect the physical load on the driver. For example, the biosensor 39 is a sensor that detects the myoelectric potential signal accompanying a driving operation by the driver, and is provided on one or both of the steering wheel and the seat. The biosensor 39 provided on the steering wheel detects the myoelectric potential signal of arm muscles accompanying a steering operation by the driver. The biosensor 39 provided on the seat detects the myoelectric potential signal of lower limb muscles accompanying an accelerator operation or a brake operation by the driver.

The notification device 43 is driven by the driver assistance apparatus 50, and notifies the driver of the vehicle 1 of various kinds of information by means of, for example, image display or audio output. The notification device 43 includes, for example, a display device provided in an instrument panel and a speaker provided in the vehicle 1. The display device may be a display device of a navigation system. Moreover, the notification device 43 may be an HUD (head-up display) that provides display on a front windshield.

(1-3-2. Functional Configuration)

Next, a functional configuration of the driver assistance apparatus 50 is described.

The driver assistance apparatus 50 serves as an apparatus that assists in driving the vehicle by one or more processors such as CPUs executing a computer program. The computer program is a computer program that causes the processors to carry out operation described later to be carried out by the driver assistance apparatus 50. The computer program to be executed by the processors may be held in a recording medium that serves as a storage (memory) 55 provided in the driver assistance apparatus 50, or may be held in a recording medium built in the driver assistance apparatus 50 or any recording medium externally attachable to the driver assistance apparatus 50.

A recording medium that contains the computer program may be: a magnetic medium such as a hard disk, a floppy disk, and a magnetic tape; an optical recording medium such as a CD-ROM (Compact Disk Read Only Memory), a DVD (Digital Versatile Disk), and a Blu-ray (registered trademark); a magneto-optical medium such as a floptical disk; a storage element such as a RAM and a ROM; a flash memory such as a USB (Universal Serial Bus) memory and an SSD; or any other medium configured to contain programs.

FIG. 8 is a block diagram illustrating the functional configuration of the driver assistance apparatus 50.

To the driver assistance apparatus 50, the surrounding environment sensor 31, the vehicle state sensor 33, the position detection sensor 35, the vehicle internal imaging camera 37, and the biosensor 39 are coupled through a dedicated line or through communication means such as a CAN (Controller Area Network) or a LIN (Local Inter Net). Moreover, to the driver assistance apparatus 50, the vehicle controller 41 and the notification device 43 are coupled.

It is to be noted that the driver assistance apparatus 50 is not limited to an electronic control unit mounted on the vehicle 1. Instead, the driver assistance apparatus 50 itself may be a terminal device such as a smartphone or a wearable device.

The driver assistance apparatus 50 includes a communicator 51, a processor 53, and the storage 55. The communicator 51 is an interface for the communication with the management server 110 through the communication network 105. The processor 53 includes one or more processors such as CPUs. A part or all of the processor 53 may include an updatable one such as firmware, or may be a program module or the like to be executed by a command from a CPU or the like.

The storage 55 includes one or more memories such as a RAM and a ROM, and is communicatably coupled to the processor 53. However, there is no particular limitation on the number of the storages 55 and the kind of the storage 55. The storage 55 holds a computer program to be executed by the processor 53, and information such as various parameters to be used in calculation, detection data, calculation results, etc. Moreover, the storage 55 holds the map data. A part of the storage 55 is used as a work area for the processor 53.

The processor 53 includes an acquirer 61, a surrounding environment detector 63, a driver information calculator 65, a vehicle information detector 67, a travel scene determiner 69, a communication controller 71, and a notification processor 73. Functions of these units are realized by a processor executing a computer program. It is to be noted that some of the acquirer 61, the surrounding environment detector 63, the driver information calculator 65, the vehicle information detector 67, the travel scene determiner 69, the communication controller 71, and the notification processor 73 may be configured by hardware such as an analog circuit.

The acquirer 61 acquires the sensor signals or the image data outputted from the surrounding environment sensor 31, the vehicle state sensor 33, the position detection sensor 35, the vehicle internal imaging camera 37, and the biosensor 39 on the predetermined processing cycles.

The surrounding environment detector 63 detects the surrounding environment of the vehicle 1 based on the sensor signals or the image data outputted from the surrounding environment sensor 31. For example, the surrounding environment detector 63 extracts feature points from the image data, and recognizes an object by matching a pattern of the feature points with reference data prepared in advance. The surrounding environment detector 63 recognizes various objects such as an artificial or natural stationary object, lines drawn on roads such as lane lines or crosswalks, and the like in addition to a moving object such as a person, a bicycle, a motorcycle, or a four-wheeled vehicle. Moreover, the surrounding environment detector 63 calculates a position and a speed of the recognized object and a distance to the object. The surrounding environment detector 63 may detect information regarding a road on which the vehicle 1 travels, based on the map data and the positional information regarding the vehicle 1.

It is to be noted that the surrounding environment sensor 31 may carry out the processing to recognize these moving objects, stationary objects, and the like. In this case, the driver assistance apparatus 50 acquires measurement information including the recognition results from the surrounding environment sensor 31.

The driver information calculator 65 measures one or both of the mental state of, and the physical load on, the driver on the predetermined processing cycles. The driver information calculator 65 estimates the mental state of the driver based on the mimic muscles of the face of the driver acquired from the image data by the vehicle internal imaging camera 37. The mental state of the driver may be measured by using a camera attached to the driver. Moreover, the driver information calculator 65 estimates the physical load on the driver based on the myoelectric potential signal outputted from the biosensor 39. The physical load on the driver may be measured by using a biosensor communicatably coupled to the driver assistance apparatus 50 and attached to the driver.

The vehicle information detector 67 detects various kinds of the vehicle state information. Specifically, the vehicle information detector 67 obtains, by calculation, the direction of movement of the vehicle 1 based on the positional information inputted from the position detection sensor 35. Moreover, the vehicle information detector 67 detects the travel state of the vehicle 1 based on the sensor signal outputted from the vehicle state sensor 33. Specifically, the vehicle information detector 67 detects a speed, an acceleration rate, an angular speed, the steering angle, an accelerator position, and an amount of brake operation of the vehicle 1. Furthermore, the vehicle information detector 67 detects the on/off states of the turn signal lamps. In addition, the vehicle information detector 67 calculates the amount of energy consumption corresponding to the speed and the acceleration rate when the speed of the vehicle 1 changes from a certain speed to another speed by acceleration/deceleration. As data regarding the amount of energy consumption of the vehicle 1, a parameter at the time of design of the vehicle 1 may be used instead of actual measurement data.

The travel scene determiner 69 determines whether the vehicle 1 is going to pass through the specific travel scene set in advance, based on the information regarding the surrounding environment of the vehicle 1. Specifically, the travel scene determiner 69 compares a road structure in the surrounding environment of the vehicle 1 and a traffic situation indicating positional relation between surrounding traffic participants present around the vehicle 1, with a situation set as the specific travel scene. The road structure and the traffic situation are detected by the surrounding environment detector 63. The travel scene determiner 69 determines that the vehicle 1 is going to pass through the specific travel scene when the road structure and the traffic situation correspond to the specific travel scene. The road structure is road-related information exemplified by, for example, the number of lanes (travel zones) of a road, a merging situation, a crossing situation, a radius of curvature, a road width or a travel zone width, a kind of a road (e.g., a general road, an inter-city expressway, an urban expressway, a road in a residential section, or a shopping street), and the kind of borderlines of a road or a travel zone.

Moreover, after determining that the vehicle 1 is going to pass through the specific travel scene, the travel scene determiner 69 determines whether the vehicle 1 has finished passing through the specific travel scene. Specifically, the travel scene determiner 69 determines that the vehicle 1 has finished passing through the specific travel scene when the vehicle 1 has left an area of the road structure corresponding to the specific travel scene or become free from the traffic situation corresponding to the specific travel scene.

The communication controller 71 transmits, at predetermined timing, the vehicle measurement data including the driver state information and the vehicle state information to the management server 110. Specifically, the communication controller 71 transmits the vehicle measurement data to the management server 110 when the travel scene determiner 69 determines that the vehicle 1 is going to pass through the specific travel scene and when the travel scene determiner 69 determines that the vehicle 1 has passed through the specific travel scene.

The notification processor 73 receives the notification information transmitted from the management server 110, and allows the notification device 43 to notify the driver of the notification information. In the embodiment, the notification processor 73 acquires the notification information from the management server 110 before and after the vehicle 1 passes through the specific travel scene, and notifies the driver of the acquired notification information.

(1-3-3. Processing Operation)

Next, processing operation by the driver assistance apparatus 50 is described in detail.

FIGS. 9 to 13 illustrate flowcharts of the processing operation by the driver assistance apparatus 50. FIG. 9 is a flowchart illustrating a routine of the processing operation by the driver assistance apparatus 50.

At a start-up of an in-vehicle system including the driver assistance apparatus 50 (step S21), the processor 53 starts processing to calculate and record the vehicle state information and the driver state information (step S23). The vehicle state information includes the information regarding the amount of energy consumption. The driver state information includes the information regarding the mental state of, and the physical load on, the driver. Specifically, the driver information calculator 65 of the processor 53 acquires the information identifying the driver, and records the acquired identification information regarding the driver. For example, the driver information calculator 65 identifies the driver based on the amount of feature of the face of the driver acquired from the image data by the vehicle internal imaging camera 37, and records the identification information such as an identification number assigned to each driver. The driver information calculator 65 may identify the driver based on information inputted by the driver.

Moreover, the driver information calculator 65 estimates the mental state of the driver based on the mimic muscles of the face of the driver acquired from the image data by the vehicle internal imaging camera 37. The mental state of the driver is preferably indicated by, for example, the same criterion as the mental state of the passer-by H, but may be indicated by a different criterion as long as the mental state of the driver is convertible into the same criterion as the mental state of the passer-by H. Furthermore, the driver information calculator 65 estimates the physical load on the driver based on the myoelectric potential signal outputted from the biosensor 39. The physical load on the driver is expressed as, for example, an amount of calorie consumption per unit time.

Moreover, the vehicle information detector 67 of the processor 53 obtains, by calculation, the direction of movement of the vehicle 1 based on the positional information inputted from the position detection sensor 35. For example, the vehicle information detector 67 is configured to obtain, by calculation, the direction of movement of the vehicle 1 based on a temporal change in the positional information inputted on the predetermined processing cycles. Furthermore, the vehicle information detector 67 detects the travel state of the vehicle 1 based on the sensor signal outputted from the vehicle state sensor 33. Specifically, the vehicle information detector 67 detects the speed, the acceleration rate, the angular speed, the steering angle, the accelerator position, and the amount of brake operation of the vehicle 1. In addition, the vehicle information detector 67 detects the on/off states of the turn signal lamps.

Furthermore, the vehicle information detector 67 calculates the amount of energy consumption corresponding to the speed and the acceleration rate when the speed of the vehicle 1 changes from a certain speed to another speed by acceleration/deceleration. For example, when the driving force source 9 is an internal combustion engine, the vehicle information detector 67 sets, as the amount of energy consumption, an integrated value of an amount of fuel injection during a change in the speed of the vehicle 1 from a certain speed to another speed by acceleration/deceleration. Moreover, when the driving force source 9 is a driving motor, the vehicle information detector 67 sets, as the amount of energy consumption, an integrated value of an amount of electric power consumption during the change in the speed of the vehicle 1 from a certain speed to another speed by acceleration/deceleration. As the data regarding the amount of energy consumption of the vehicle 1, the parameter at the time of the design of the vehicle 1 may be used instead of the actual measurement data.

Thereafter, the processing to calculate and record the vehicle state information and the driver state information started in step S23 is repeatedly carried out on the predetermined processing cycles.

Next, the processor 53 carries out assistance processing to assist the driver in driving the vehicle 1 (step S25). In the embodiment, as the assistance processing, the processor 53 performs notification processing to give a notification of the notification information to assist the driver in driving.

FIG. 10 is a flowchart of the assistance processing.

First, the travel scene determiner 69 of the processor 53 determines whether the vehicle 1 is going to pass through the specific travel scene (step S31). Specifically, the travel scene determiner 69 compares the road structure in the surrounding environment of the vehicle 1 and the traffic situation indicating the positional relation between the surrounding traffic participants present around the vehicle 1, with the situation set as the specific travel scene. The road structure and the traffic situation are detected by the surrounding environment detector 63. The travel scene determiner 69 determines that the vehicle 1 is going to pass through the specific travel scene when the road structure and the traffic situation correspond to the specific travel scene. For example, the travel scene determiner 69 may determine that the vehicle 1 is going to pass through the specific travel scene when detecting the road structure and the traffic situation corresponding to the specific travel scene. Alternatively, the travel scene determiner 69 may determine that the vehicle 1 is going to pass through the specific travel scene when the vehicle 1 approaches, up to a certain distance, the road structure and the traffic situation corresponding to the specific travel scene. The certain distance may be, for example, a constant value set to, for example, 30 m to 50 m, or may be a value that varies with the speed of the vehicle 1.

When the travel scene determiner 69 does not determine that the vehicle 1 is going to pass through the specific travel scene (S31/No), the travel scene determiner 69 repeats the determination in step S31. Meanwhile, when the travel scene determiner 69 determines that the vehicle 1 is going to pass through the specific travel scene (S31/Yes), the processor 53 carries out pre-passing processing (step S33). The pre-passing processing is the assistance processing to be performed before the vehicle 1 passes through the specific travel scene.

FIG. 11 illustrates a flowchart of the pre-passing processing.

In the pre-passing processing, the communication controller 71 of the processor 53 transmits, to the management server 110, information indicating that the vehicle 1 is going to pass through the specific travel scene and the vehicle measurement data together with the identification information regarding the driver (step S41). The vehicle measurement data includes the positional information regarding the vehicle 1, the information regarding the surrounding environment detected immediately before, the vehicle state information, and the driver state information. That is, the driver assistance apparatus 50 transmits, to the management server 110, information indicating where the vehicle 1 is positioned in the specific travel scene, what kind of the travel state the vehicle 1 is traveling in, what kind of mental state the driver is in, how much physical load is imposed on the driver, and what kind of situation the surrounding traffic participants are in.

Next, the notification processor 73 of the processor 53 receives the notification information transmitted from the management server 110 (step S43). As described later, the notification information to be transmitted by the management server 110 is information set based on a difference that appears in the total optimization of the entire traffic participants including the surrounding traffic participants between a case with a change in the driving behavior of the driver of the vehicle 1 when passing through the specific travel scene and a case without the change in the driving behavior of the driver of the vehicle 1. The notification information transmitted by the management server 110 in the pre-passing processing includes assistance information regarding recommended driving behavior that possibly enhance the total optimization when the vehicle 1 passes through the specific travel scene.

Next, the notification processor 73 notifies the driver of the received notification information (step S45). Specifically, the notification processor 73 controls driving of the notification device 43 to notify the driver of the assistance information regarding the recommended driving behavior received from the management server 110. This makes it possible for the notification processor 73 to prompt the driver to take the driving behavior that leads to enhancement in the total optimization in the specific travel scene.

Back to FIG. 10, when the pre-passing processing is carried out, the travel scene determiner 69, next, determines whether the vehicle 1 has passed the specific travel scene (step S35). For example, the travel scene determiner 69 determines that the vehicle 1 has passed the specific travel scene when the vehicle 1 has left the area of the road structure corresponding to the specific travel scene determined in step S31 or become free from the traffic situation corresponding to the specific travel scene determined in step S31.

When the travel scene determiner 69 does not determine that the vehicle 1 has passed through the specific travel scene (S35/No), the travel scene determiner 69 repeats the determination in step S35. Meanwhile, when the travel scene determiner 69 determines that the vehicle 1 has passed through the specific travel scene (S35/Yes), the processor 53 carries out post-passing processing (step S37). The post-passing processing is the assistance processing to be performed after the vehicle 1 passes through the specific travel scene.

FIG. 12 illustrates a flowchart of the post-passing processing.

In the post-passing processing, the communication controller 71 determines whether the driver has changed the driving behavior while the vehicle 1 passes through the specific travel scene (step S51). For example, the communication controller 71 determines whether the vehicle 1 has decelerated or stopped short of the crosswalk or whether the vehicle 1 has let a random vehicle cut in on the vehicle 1, based on the vehicle measurement data collected and recorded while the vehicle 1 passes through the specific travel scene. The contents of the determination are set in advance in accordance with the specific travel scene.

When the communication controller 71 determines that the driver has changed the driving behavior while the vehicle 1 passes through the specific travel scene (S51/Yes), the communication controller 71 records the vehicle measurement data collected while the vehicle 1 passes through the specific travel scene, as the vehicle measurement data with the change in the driving behavior of the driver (step S53), and causes the flow to proceed to step S59.

Meanwhile, when the communication controller 71 does not determine that the driver has changed the driving behavior while the vehicle 1 passes the specific travel scene (S51/No), the communication controller 71 determines whether the vehicle 1 has been influenced by a change in driving behavior of a random vehicle while the vehicle 1 passes through the specific travel scene (step S55). For example, the communication controller 71 determines, based on the vehicle measurement data collected and recorded while the vehicle 1 passes through the specific travel scene, whether the vehicle 1 has rapidly decelerated as the random vehicle decelerates or stops short of the crosswalk, or whether the random vehicle has let the vehicle 1 cut in on the random vehicle. The contents of the determination are set in advance in accordance with the specific travel scene.

When the communication controller 71 determines that the vehicle 1 has been influenced by the change in the driving behavior of the random vehicle while the vehicle 1 passes through the specific travel scene (S55/Yes), the communication controller 71 records the vehicle measurement data collected while the vehicle 1 passes through the specific travel scene, as the vehicle measurement data when the vehicle 1 has been influenced by the change in the driving behavior of the random vehicle (step S57), and causes the flow to proceed to step S59.

Meanwhile, when the communication controller 71 does not determine that the vehicle 1 has been influenced by the change in the driving behavior of the random vehicle while the vehicle 1 passes through the specific travel scene (S55/No), the communication controller 71 causes the flow to proceed to step S59. In step S59, the communication controller 71 transmits, to the management server 110, information indicating that the vehicle 1 has finished passing through the specific travel scene, and the vehicle measurement data collected and recorded while the vehicle 1 passes through the specific travel scene (step S59). Here, any one of the following is transmitted to the management server 110: the vehicle measurement data with the change in the driving behavior of the driver; the vehicle measurement data when the vehicle 1 is influenced by the change in the driving behavior of the random vehicle; or the vehicle measurement data without the change in the driving behavior of the driver when the vehicle 1 has not been influenced by the change in the driving behavior of the random vehicle.

The vehicle measurement data includes time-series data including the positional information regarding the vehicle 1, the information regarding the surrounding environment detected immediately before, the vehicle state information, and the driver state information. That is, the driver assistance apparatus 50 transmits, to the management server 110, information indicating what kind of driving behavior the driver has selected while the vehicle 1 passes through the specific travel scene, what kind of travel state the vehicle 1 has traveled in, what kind of mental state the driver has been in, how much physical load has been imposed on the driver, and furthermore, what kind of situation the surrounding traffic participants have been in.

Next, the notification processor 73 of the processor 53 receives advisory information transmitted from the management server 110 (step S61). As described later, the notification information to be transmitted by the management server 110 is the advisory information set based on the total optimization of the traffic participants including the surrounding traffic participants while the vehicle 1 passes through the specific travel scene. The advisory information to be transmitted by the management server 110 in the post-passing processing includes information indicating how the vehicle 1 has influenced the total optimization while passing through the specific travel scene, or what kind of driving behavior the vehicle 1 should have taken.

Next, the notification processor 73 notifies the driver of the received advisory information (step S63). Specifically, the notification processor 73 controls the driving of the notification device 43 to notify the driver of the advisory information received from the management server 110. This makes it possible for the driver to know how their driving behavior contributed to the total optimization while passing through the specific travel scene, or what kind of driving behavior they should take when passing through the same specific travel scene the next time.

Back to FIG. 9, after the assistance processing is carried out, the processor 53 determines whether the in-vehicle system has stopped (step S27). When the processor 53 does not determine that the in-vehicle system has stopped (S27/No), the processor 53 repeats the assistance processing in step S25. Meanwhile, when the processor 53 determines that the in-vehicle system has stopped (S27/Yes), the processor 53 stops the processing.

As described above, when the vehicle 1 encounters the specific travel scene, the driver assistance apparatus 50 acquires the assistance information from the management server 110 before passing through the specific travel scene, and notifies the driver of the information regarding the recommended driving behavior. Moreover, after the vehicle 1 passes through the specific travel scene, the driver assistance apparatus 50 acquires the advisory information based on the driving behavior of the driver while passing through the specific travel scene, from the management server 110, and notifies the driver of the advisory information. Furthermore, the driver assistance apparatus 50 transmits the vehicle measurement data collected while passing through the specific travel scene to the management server 110 every time the vehicle passes through the specific travel scene.

<1-4. Management Server>

Next, the management server 110 is described in detail.

The management server 110 serves as an apparatus that sets information to assist in driving the vehicle by one or more processors such as CPUs executing a computer program. The computer program is a computer program that causes the processors to carry out operation described later to be carried out by the management server 110. The computer program to be executed by the processor may be held in a recording medium that serves as a storage (memory) 115 provided in the management server 110, or may be held in a recording medium built in the management server 110 or any recording medium externally attachable to the management server 110.

A recording medium that contains the computer program may be: a magnetic medium such as a hard disk, a floppy disk, and a magnetic tape; an optical recording medium such as a CD-ROM, a DVD, and a Blu-ray (registered trademark); a magneto-optical medium such as a floptical disk; a storage element such as a RAM and a ROM; a flash memory such as a USB memory and an SSD; or any other medium configured to contain programs.

(1-4-1. Functional Configuration)

FIG. 13 is a block diagram illustrating a functional configuration of the management server 110.

The management server 110 includes a communicator 111, a processor 113, the storage 115, and a collected data storage 117. The communicator 111 is an interface for communication with the mobile terminal 130 and the driver assistance apparatus 50 through the communication network 105. The processor 113 includes one or more CPUs, and carries out total optimization calculation processing and driver assistance processing.

The storage 115 includes one or more memories, and holds a computer program to be executed by the processor 113, various parameters to be used in calculation processing, and information regarding calculation results. The storage 115 may be: a magnetic medium such as a hard disk, a floppy disk, and a magnetic tape; an optical recording medium such as a CD-ROM, a DVD, and a Blu-ray (registered trademark); a magneto-optical medium such as a floptical disk; a storage element such as a RAM and a ROM; a flash memory such as a USB memory and an SSD; or any other recording medium.

The collected data storage 117 holds the vehicle measurement data measured in the predetermined specific travel scene and transmitted from the first terminals (driver assistance apparatuses) mounted on the respective vehicles, and the passer-by measurement data transmitted from the second terminals (mobile terminals) carried by the respective passers-by. The collected data storage 117 may be: a magnetic medium such as a hard disk, a floppy disk, and a magnetic tape; an optical recording medium such as a CD-ROM, a DVD, and a Blu-ray (registered trademark); a magneto-optical medium such as a floptical disk; a flash memory such as a USB memory and an SSD; or any other recording medium.

In the collected data storage 117, the vehicle measurement data regarding the vehicle 1 collected while the vehicle 1 passes through the predetermined specific travel scene, and the vehicle measurement data regarding the random vehicles present in the specific travel scene and the passer-by measurement data regarding the passers-by H are held in association with one another. The data to be held in the collected data storage 117 is described in detail later.

The processor 113 includes a communication controller 121, a total optimization calculator 123, and a driver assistance processor 125. Functions of these units are realized by a processor executing a computer program.

The communication controller 121 communicates with the driver assistance apparatus (first terminal) 50 mounted on the vehicle 1 and the mobile terminal (second terminal) 130 carried by the passer-by H, and controls transmission and reception of various kinds of data or information. Specifically, the communication controller 121 communicates with the driver assistance apparatus 50, receives the information indicating that the vehicle 1 is going to pass through the predetermined specific travel scene or the vehicle measurement data, and transmits the notification information. Moreover, the communication controller 121 communicates with the mobile terminal 130, receives the positional information, transmits the data transmission request to the mobile terminal 130 of the passer-by H present in the specific travel scene, and receives the passer-by measurement data transmitted from the mobile terminal 130.

The total optimization calculator 123 calculates a first load state value with the change in the driving behavior of the driver of the assistance target vehicle 1 in the predetermined specific travel scene, and a second load state value without the change in the driving behavior of the driver of the assistance target vehicle 1 in the predetermined specific travel scene. The first load state value and the second load state value are load state values indicating a change in a load state of each of the drivers of the random vehicles and the passers-by H present in the specific travel scene. In the embodiment, the total optimization calculator 123 calculates a first mental state value and a first physical load state value with the change in the driving behavior of the driver of the assistance target vehicle 1 in the predetermined specific travel scene, and a second mental state value and a second physical load state value without the change in the driving behavior of the driver of the assistance target vehicle 1 in the predetermined specific travel scene.

Furthermore, the total optimization calculator 123 calculates a total optimization evaluation value indicating an influence of the driving behavior of the assistance target vehicle on the total optimization, based on a difference between the first load state value and the second load state value. In the embodiment, the total optimization calculator 123 calculates the total optimization evaluation value based on a difference between the first mental state value and the second mental state value, and the total optimization evaluation value based on a difference between the first physical load state value and the second physical load state value.

In addition, in the embodiment, the total optimization calculator 123 further calculates a first energy state value with the change in the driving behavior of the driver of the assistance target vehicle 1 in the predetermined specific travel scene, and a second energy state value without the change in the driving behavior of the driver of the assistance target vehicle 1 in the predetermined specific travel scene. The first energy state value and the second energy state value are energy state values indicating a change in an amount of energy consumption of each of the random vehicles present in the specific travel scene. Moreover, in the embodiment, the total optimization calculator 123 further calculates the total optimization evaluation value based on a difference between the first energy state value and the second energy state value.

The driver assistance processor 125 carries out processing to assist in driving the assistance target vehicle 1 based on the total optimization evaluation value calculated by the total optimization calculator 123. In the embodiment, the driver assistance processor 125 sets the notification information to assist in driving the assistance target vehicle 1. The notification information includes the assistance information to be notified before the assistance target vehicle 1 passes through the predetermined specific travel scene, and the advisory information to be notified after the assistance target vehicle 1 passes through the predetermined specific travel scene. The set notification information is transmitted to the driver assistance apparatus 50 by the communication controller 121.

(1-4-2. Processing Operation)

FIG. 14 is a flowchart of processing operation by the management server 110. The flowchart illustrated in FIG. 14 is repeatedly executed on the predetermined processing cycles.

First, the communication controller 121 receives the data transmitted from the driver assistance apparatuses (first terminals) 50 mounted on the vehicles 1 and the mobile terminals (second terminals) 130 carried by the passers-by H (step S71). When any one of the driver assistance apparatuses (first terminals) 50 has carried out the processing to transmit the information indicating that the vehicle 1 is going to pass through the predetermined specific travel scene and the vehicle measurement data in step S41 described above, the communication controller 121 receives the information and the data. Moreover, the communication controller 121 receives the positional information transmitted from the mobile terminals (second terminals) 130.

Next, the total optimization calculator 123 determines whether the information indicating that the vehicle is going to pass through the predetermined specific travel scene has been acquired from the driver assistance apparatus (first terminal) 50 of any vehicle (assistance target vehicle) 1 out of the vehicles 1 including the driver assistance apparatuses 50 (step S73). When the total optimization calculator 123 does not determine that the information indicating that the vehicle is going to pass through the predetermined specific travel scene has been acquired from the driver assistance apparatus 50 of any vehicle (assistance target vehicle) 1 (S73/No), the flow returns to step S71. Meanwhile, when the total optimization calculator 123 determines that the information indicating that the vehicle is going to pass through the predetermined specific travel scene has been acquired from the driver assistance apparatus 50 of any vehicle (assistance target vehicle) 1 (S73/Yes), the total optimization calculator 123 carries out pre-passing assistance information setting processing (step S75). The pre-passing assistance information setting processing is processing to set the assistance information to be notified to the driver of the assistance target vehicle 1 before the assistance target vehicle 1 passes through a predetermined specific travel scene.

FIG. 15 is a flowchart of the pre-passing assistance information setting processing.

Based on the positional information transmitted from the driver assistance apparatuses 50 of the respective vehicles 1 and the mobile terminals 130 of the passers-by H, the total optimization calculator 123 identifies the surrounding traffic participants present in the specific travel scene through which the assistance target vehicle 1 is going to pass, and acquires the vehicle measurement data and the passer-by measurement data from the first terminals and the second terminals of the respective surrounding traffic participants (step S91).

Specifically, the surrounding traffic participants as targets of the total optimization are set in accordance with the specific travel scene. For example, the surrounding traffic participants as the targets are identified as the random vehicles and the passers-by H present in a predetermined area set in accordance with the specific travel scene with reference to the position of the assistance target vehicle 1. For example, the predetermined area may be an area within a predetermined distance from the assistance target vehicle 1. Alternatively, the predetermined area may be an area within a distance that the assistance target vehicle 1 can travel in predetermined time, obtained in accordance with the speed of movement of the assistance target vehicle 1. Moreover, the surrounding traffic participants as the targets may be identified as the predetermined number of the random vehicles and the passers-by H in the order of closeness to the assistance target vehicle 1 among the random vehicles and the passers-by H present in the predetermined area mentioned above. Thus, the random vehicles or the passers-by H having a low degree of influence on the total optimization is excluded from calculation of the total optimization, making it possible to provide appropriate assistance to the assistance target vehicle 1.

Furthermore, the total optimization calculator 123 transmits a message of a request for transmission of the vehicle measurement data and the passer-by measurement data, to the driver assistance apparatuses 50 and the mobile terminals 130 of the surrounding traffic participants identified, and acquires the vehicle measurement data and the passer-by measurement data in return.

Next, the total optimization calculator 123 extracts, from the vehicle measurement data and the passer-by measurement data held in the collected data storage 117, the vehicle measurement data and the passer-by measurement data collected previously in the same specific travel scene as the specific travel scene through which the assistance target vehicle 1 is going to pass (step S93). The vehicle measurement data and the passer-by measurement data to be extracted are measurement data transmitted, to the management server 110, from the driver assistance apparatuses 50 of the vehicles present in the past in the specific travel scene, and the mobile terminals 130 of the passers-by H present in the past in the specific travel scene, and stored in association with each other. The same specific travel scene is not limited to the specific travel scene at the same position on the map, but refers to the specific scene in which at least a traffic environment such as the road structure, the positions of the presence of the surrounding traffic participants, and the speeds of movement of the surrounding traffic participants is determined as falling within a predetermined error.

Next, based on the extracted vehicle measurement data and the extracted passer-by measurement data, the total optimization calculator 123 calculates the first mental state value and the first physical load state value, and the first energy state value (step S95). The first mental state value and the first physical load state value indicate the change in the load state of the surrounding traffic participant with the change in the driving behavior of the driver of the assistance target vehicle 1 while passing through the specific travel scene. The first energy state value indicates the change in the amount of energy consumption (consumption rate) of the random vehicle.

Specifically, the total optimization calculator 123 extracts, from the extracted measurement data, the vehicle measurement data and the passer-by measurement data regarding the surrounding traffic participants with a change in driving behavior of a driver of any vehicle while passing through the specific travel scene. Moreover, based on the extracted vehicle measurement data and the extracted passer-by measurement data, the total optimization calculator 123 obtains a first mental state value $Cx1\_i$ related to the change in the mental state of each of the surrounding traffic participants and a first physical load state value $Cy1\_i$ related to the change in the physical load on each of the surrounding traffic participants. Furthermore, in the embodiment, based on the extracted vehicle measurement data, the total optimization calculator 123 further obtains a first energy state value $Cz1\_i$ related to the change in the amount of energy consumption of the random vehicle.

For example, when there are five random vehicles and two passers-by H as the surrounding traffic participants in addition to the assistance target vehicle 1, the total optimization calculator 123 calculates the first mental state value $Cx1\_i$ ($i=1, 2, \ldots, 7$) indicating the change in the mental state of each of the surrounding traffic participants and the first physical load state value $Cy1\_i$ ($i=1, 2, \ldots, 7$) indicating the change in the physical load on each of the surrounding traffic participants. Moreover, the total optimization calculator 123 calculates the first energy state value $Cz1\_i$ ($i=1, 2, \ldots, 5$) indicating the change in the amount of energy consumption of each of the random vehicles.

The first mental state value $Cx1\_i$ represents the change (difference) in the mental state of each of the surrounding traffic participants. In the embodiment, the mental state is calculated in 11 stages of $-5$ to 5. As the mental state takes a positive value of a larger absolute value, the mental state indicated is more positive. Accordingly, as the mental state value Cx takes a positive value of a larger absolute value, the mental state value Cx indicates a change to a more positive mental state. That is, the first mental state value $Cx1\_i$ does not evaluate, as a whole, the mental states of the respective surrounding traffic participants while the assistance target vehicle 1 passes through the specific travel scene, but indicates how much the mental state of each of the surrounding traffic participants changes with the change in the driving behavior of the assistance target vehicle 1.

The first physical load state value $Cy1\_i$ represents the change (difference) in the physical load on each of the surrounding traffic participants. In the embodiment, the physical load is calculated as the amount of calorie consumption per unit time. As the physical load takes a positive value of a larger absolute value, the physical load indicated is larger. Accordingly, as the physical load state value Cy takes a negative value of a larger absolute value, the physical load state value Cy indicates that the physical load has decreased. That is, the first physical load state value Cy1_i does not evaluate, as a whole, the physical loads on the respective surrounding traffic participants while the assistance target vehicle 1 passes through the specific travel scene, but indicates how much the physical load on each of the surrounding traffic participants changes with the change in the driving behavior of the assistance target vehicle 1.

The first energy state value Cz1_i represents the change (difference) in the amount of energy consumption of each of the random vehicles. The amount of energy consumption is an amount of fuel consumption or electric power consumption to drive the driving power source of the vehicle. As the energy state value Cz takes a negative value of a larger absolute value, the energy state value Cz indicates that each vehicle has taken driving behavior of low fuel consumption. That is, the first energy state value Cz1_i does not evaluate, as a whole, the amounts of energy consumption of the respective random vehicles while the assistance target vehicle 1 passes through the specific travel scene, but indicates how much the amount of energy consumption of each of the surrounding traffic participants changes with the change in the driving behavior of the assistance target vehicle 1.

Next, based on the extracted vehicle measurement data and the extracted passer-by measurement data, the total optimization calculator 123 calculates the second mental state value and the second physical load state value, and the second energy state value (step S97). The second mental state value and the second physical load state value indicate the change in the load state of the surrounding traffic participant without the change in the driving behavior of the driver of the assistance target vehicle 1 while passing through the specific travel scene. The second energy state value indicates the change in the amount of energy consumption (consumption rate) of the random vehicle.

Specifically, the total optimization calculator 123 extracts, from the extracted measurement data, the vehicle measurement data and the passer-by measurement data regarding the surrounding traffic participants without a change in driving behavior of a driver of any vehicle while passing through the specific travel scene. Moreover, based on the extracted vehicle measurement data and the extracted traffic person measurement data, the total optimization calculator 123 obtains a second mental state value Cx2_i related to the change in the mental state of each of the surrounding traffic participants and a second physical load state value Cy2_i related to the change in the physical load on each of the surrounding traffic participants. Furthermore, in the embodiment, based on the extracted vehicle measurement data, the total optimization calculator 123 further obtains a second energy state value Cz2_i related to the change in the amount of energy consumption of the random vehicle.

The second mental state value Cx2_i indicates how much the mental state of each of the surrounding traffic participants changes with continuation of the driving behavior of the assistance target vehicle 1. The second physical load state value Cy2_i indicates how much the physical load on each of the surrounding traffic participants changes with the continuation of the driving behavior of the assistance target vehicle 1. The second energy state value Cz2_i indicates how much the amount of energy consumption of each of the surrounding traffic participants changes with the continuation of the driving behavior of the assistance target vehicle 1.

It is to be noted that in the above-described example of the scene of the lane merge, a case of the continuation of the driving behavior of the vehicle corresponds to a situation in which a vehicle traveling in the travel zone on the merged side continues traveling without letting a random vehicle traveling in the travel zone on the merging side cut in. Moreover, a case of the change in the driving behavior of the vehicle corresponds to a situation in which a vehicle traveling in the travel zone on the merged side decelerates or stops to let a random vehicle traveling in the travel zone on the merging side cut in.

Alternatively, in the above-described example of the scene of passing through the crosswalk, the case of the continuation of the driving behavior of the vehicle corresponds to a situation in which a traveling vehicle continues traveling without stopping short of the crosswalk even though there is a pedestrian approaching the crosswalk. Moreover, the case of the change in the driving behavior of the vehicle corresponds to a situation in which a traveling vehicle decelerates or stops short of the crosswalk and gives priority to crossing of the pedestrian.

Next, the total optimization calculator 123 calculates the total optimization evaluation value based on the first mental state value Cx1_i, the first physical load state value Cy1_i, and the first energy state value Cz1_i, and the second mental state value Cx2_i, the second physical load state value Cy2_i, and the second energy state value Cz2_i that have been calculated (step S99). The total optimization evaluation value includes one or both of the total optimization evaluation value CX based on the changes in the mental states of the surrounding traffic participants and the total optimization evaluation value CY based on the changes in the physical load states of the surrounding traffic participants. In the embodiment, the total optimization calculator 123 calculates the total optimization evaluation value CX based on the changes in the mental states of the surrounding traffic participants, the total optimization evaluation value CY based on the changes in the physical load states of the surrounding traffic participants, and the total optimization evaluation value CZ based on the changes in the amounts of energy consumption of the surrounding random vehicles.

In the embodiment, the total optimization evaluation values CX, CY, and CZ are expressed by the following Expression (1).

[Mathematical Expression 1]

$$CX = \sum_{i}^{N}(C_x1\_i - C_x2\_i) \tag{1}$$

$$CY = -\sum_{i}^{N}(C_y1\_i - C_y2\_i)$$

$$CZ = -\sum_{i}^{N}(C_z1\_i - C_z2\_i)$$

The total optimization evaluation value CX indicates a sum of the changes in the mental states of the surrounding traffic participants, and indicates how and how much the mental states of the surrounding traffic participants change as a whole with the change in the driving behavior of the assistance target vehicle 1. As the total optimization evaluation value CX takes a positive value of a larger absolute value, the total optimization evaluation value CX indicates that the mental states of the surrounding traffic participants change positively as a whole.

The total optimization evaluation value CY indicates a sum of the changes in the physical load states of the surrounding traffic participants, and indicates how and how much the physical load states of the surrounding traffic participants change as a whole with the change in the driving behavior of the assistance target vehicle 1. As the total optimization evaluation value CY takes a positive value of a larger absolute value, the total optimization evaluation value CY indicates that the physical loads on the surrounding traffic participants decrease as a whole.

The total optimization evaluation value CZ indicates a sum of the changes in the amounts of energy consumption of the surrounding random vehicles, and indicates how and how much the amounts of energy consumption of the surrounding random vehicles change as a whole with the change in the driving behavior of the assistance target vehicle 1. As the total optimization evaluation value CZ takes a positive value of a larger absolute value, the total optimization evaluation value CZ indicates that the driving behavior of the surrounding random vehicles become driving behavior of low fuel consumption as a whole.

As these total optimization evaluation values CX, CY, and CZ take positive values of large absolute values, they indicate that effects of enhancement in the total optimization are larger.

Next, the driver assistance processor 125 sets the recommended driving behavior to be notified to the driver of the assistance target vehicles 1, based on the calculated total optimization evaluation values CX, CY, and CZ (step S101). For example, when one or both of the total optimization evaluation values CX and CY are equal to or larger than a predetermined reference value set in advance, the driver assistance processor 125 sets driving behavior assumed to change the driving behavior, as the recommended driving behavior.

Alternatively, the driver assistance processor 125 may convert the total optimization evaluation values CX and CY related to the mental state and the physical load into the same index values to obtain a sum, or convert all the total optimization evaluation values CX, CY, and CZ into the same index values to obtain a sum. When a value of the sum is equal to or larger than a predetermined reference value set in advance, the driver assistance processor 125 may set the driving behavior assumed to change the driving behavior, as the recommended driving behavior. When multiple kinds of the change in the driving behavior are assumed in the specific travel scene, the total optimization calculator 123 calculates, in step S95 described above, the first mental state value Cx1_i, the first physical load state value Cy1_i, and the first energy state value Cz1_i for each driving behavior, and calculates, in step S99, the total optimization evaluation values CX, CY, and CZ for each driving behavior. Moreover, in step S101, the driver assistance processor 125 may set driving behavior that maximizes one or both of the total optimization evaluation values CX and CY, as the recommended driving behavior.

Alternatively, the driver assistance processor 125 may convert the total optimization evaluation values CX and CY related to the mental state and the physical load into the same index values to obtain the sum, or convert all the total optimization evaluation values CX, CY, and CZ into the same index values to obtain the sum. The driver assistance processor 125 may set driving behavior that maximizes a value of the sum, as the recommended driving behavior.

Moreover, the driver assistance processor 125 may set the recommended driving behavior by weighting to reflect a prioritized item designated by the driver of the assistance target vehicle 1 among the mental state or the physical load.

Back to FIG. 14, the driver assistance processor 125 transmits the assistance information to the driver assistance apparatus 50 of the assistance target vehicle 1 that is going to pass through the specific travel scene, in accordance with the set recommended driving behavior (step S77). The assistance information includes at least the information regarding the recommended driving behavior. However, the assistance information may include one or both of information regarding the total optimization evaluation values CX, CY, and CZ and information indicating how the recommended driving behavior influences the load states of the surrounding traffic participants.

The notification processor 73 of the driver assistance apparatus 50 that has received the assistance information notifies the driver of the received assistance information. This makes it possible for the driver to take driving behavior that makes it possible to enhance the total optimization in the specific travel scene.

Next, the total optimization calculator 123 carries out post-passing advisory information setting processing (step S79). The post-passing advisory information setting processing is processing to set the advisory information to be notified to the driver of the assistance target vehicle 1 after the assistance target vehicle 1 passes through the predetermined specific travel scene.

FIG. 16 illustrates a flowchart of the post-passing advisory information setting processing.

The total optimization calculator 123 acquires, from the driver assistance apparatus 50 of the assistance target vehicle, information indicating an end of passing through the specific travel scene (step S111).

Next, the total optimization calculator 123 acquires the vehicle measurement data and the passer-by measurement data recorded while the assistance target vehicle 1 is passing through the specific travel scene, from the driver assistance apparatuses 50 and the mobile terminals 130 of the traffic participants present in the specific travel scene (step S113). The traffic participants as the targets are the assistance target vehicles 1 and the surrounding traffic participants identified in step S91.

The total optimization calculator 123 transmits the message of the request for the transmission of the vehicle measurement data and the passer-by measurement data, to the driver assistance apparatuses 50 and the mobile terminals 130 of the surrounding traffic participants. The total optimization calculator 123 receives the vehicle measurement data and the passer-by measurement data in return. At this occasion, the total optimization calculator 123 designates a period of the measurement (from the start time to the end time) and transmits the message of the request for the transmission of the measurement data. The vehicle measurement data regarding the assistance target vehicle 1 is acquired together with information indicating the end of the passing through the specific travel scene. The vehicle measurement data regarding the assistance target vehicle 1 is acquired together with information indicating whether the vehicle measurement data is the vehicle measurement data with the change in the driving behavior of the driver while passing through the specific travel scene, or whether the vehicle measurement data is the vehicle measurement data without the change in the driving behavior.

Next, the total optimization calculator 123 calculates the total optimization evaluation values CX, CY, and CZ based on the acquired vehicle measurement data and the acquired passer-by measurement data regarding the traffic participants, and the previous measurement data held in the collected data storage 117 (step S115).

FIG. 17 illustrates a flowchart of the total optimization evaluation value calculation processing in step S115. First, the total optimization calculator 123 determines whether the vehicle measurement data acquired from the driver assistance apparatus 50 of the assistance target vehicle 1 is the vehicle measurement data with the change in the driving behavior of the driver, or whether the vehicle measurement data acquired from the driver assistance apparatus 50 of the assistance target vehicle 1 is the vehicle measurement data without the change in the driving behavior (step S121).

When the total optimization calculator 123 determines that the vehicle measurement data is the vehicle measurement data with the change in the driving behavior of the driver (S121/Yes), the total optimization calculator 123 calculates the first mental state value Cx1_i, the first physical load state value Cy1_i, and the first energy state value Cz1_i by using the acquired measurement data in accordance with the above-described process in step S95 (step S123). Moreover, the total optimization calculator 123 reads out the calculation result of the second mental state value Cx2_i, the second physical load state value Cy2_i, and the second energy state value Cz2_i calculated in step S97 in the pre-passing assistance information setting processing (step S125). Thus, the total optimization calculator 123 calculates the total optimization evaluation values CX, CY, and CZ based on the first mental state value Cx1_i, the first physical load state value Cy1_i, and the first energy state value Cz1_i that have been calculated, and the second mental state value Cx2_i, the second physical load state value Cy2_i, and the second energy state value Cz2_i that have been read out, in accordance with the above-described process in step S99 (step S131).

At this occasion, when there are some traffic participants who have significantly changed to a negative mental state among the surrounding traffic participants, the total optimization calculator 123 may calculate the total optimization evaluation values while excluding the relevant the traffic participants. This makes it possible to suppress feedback that suppresses total optimized driving behavior under an influence of some traffic participants, although the other surrounding traffic participants change to a positive mental state and there is a good influence on the total optimization in terms of the amount of energy consumption and the physical load.

For example, the total optimization calculator 123 may determine which traffic participant to exclude, based on whether the traffic participant is a driver who satisfies a condition that, for example, the driving behavior of the vehicle is not smooth, or the driver is in a manner violation. Specifically, in the scene described above where multiple travel zones merge, when vehicles in a travel zone on the merged side are traveling at high speeds, and a driver suddenly steps on a brake to create space in front of the vehicle and to let a random vehicle traveling in a travel zone on the merging side cut in, the total optimization calculator 123 may exclude the driver suddenly stepping on the brake from the surrounding traffic participants.

Meanwhile, when the total optimization calculator 123 does not determine that the vehicle measurement data is the vehicle measurement data with the change in the driving behavior of the driver (S121/No), the total optimization calculator 123 calculates the second mental state value Cx2_i, the second physical load state value Cy2_i, and the second energy state value Cz2_i by using the acquired measurement data in accordance with the process in step S97 in the pre-passing assistance information setting processing (step S127). Moreover, the total optimization calculator 123 reads out the calculation result of the first mental state value Cx1_i, the first physical load state value Cy1_i, and the first energy state value Cz1_i calculated in step S95 described above (step S129). Thus, the total optimization calculator 123 calculates the total optimization evaluation values CX, CY, and CZ based on the first mental state value Cx1_i, the first physical load state value Cy1_i, and the first energy state value Cz1_i that have been read out, and the second mental state value Cx2_i, the second physical load state value Cy2_i, and the second energy state value Cz2_i that have been calculated, in accordance with the process in step S99 described above (step S131).

Back to FIG. 16, the driver assistance processor 125 sets the advisory information to be notified to the driver of the assistance target vehicles 1, based on the calculated total optimization evaluation values CX, CY, and CZ (step S117). The advisory information includes information regarding an influence of the driving behavior made by the driver of the assistance target vehicle 1 on the total optimization, and information regarding an influence of the change in the driving behavior of the driver of the assistance target vehicle 1 or absence of the change in the driving behavior on at least the mental state of, or the physical load on, the surrounding traffic participants. For example, the driver assistance processor 125 may set the total optimization evaluation values CX, CY, and CZ as the advisory information to quantitatively indicate the influence on the total optimization. Alternatively, the total optimization calculator 123 may convert the total optimization evaluation values CX and CY related to the mental state and the physical load into the same index values to obtain the sum, or convert the total optimization evaluation values CX, CY, and CZ into the same index values to obtain the sum, and set the sum as the advisory information.

At this occasion, when the total optimization evaluation values CX, CY, and CZ are equal to or smaller than their respective predetermined threshold values, the driver assistance processor 125 may exclude the total optimization evaluation values CX, CY, and CZ from the advisory information. This makes it possible to avoid an unnecessary advice based on a slight change in the load state when the assistance target vehicle has not substantially changed the driving behavior while passing through the specific travel scene.

Moreover, the driver assistance processor 125 may identify, based on the data held in the collected data storage 117, previous driving behavior that has increased the total optimization evaluation value to the predetermined reference value or more in the specific travel scene through which the assistance target vehicle 1 has passed, and set the advisory information to be notified to the driver of the assistance target vehicle 1 based on the previous driving behavior. For example, in the pre-passing assistance information setting processing, when the total optimization evaluation value is calculated for multiple kinds of the driving behavior, the driver assistance processor 125 may set one or more kinds of the driving behavior that have increased the total optimization evaluation value to the predetermined reference value or more, as the advisory information to be notified to the driver after passing through the specific travel scene. It is to be noted that whether to set the advisory information regarding the relevant driving behavior may be determined at the driver's request.

Next, the driver assistance processor 125 stores the vehicle measurement data and the passer-by measurement data regarding the assistance target vehicle 1 and the surrounding traffic participants acquired in step S113 in the collected data storage 117 in association with each other (step S119).

Back to FIG. 14, the driver assistance processor 125 transmits the set advisory information to the driver assistance apparatus 50 of the assistance target vehicle 1 (step S81). The notification processor 73 of the driver assistance apparatus 50 that has received the advisory information notifies the driver of the received advisory information. This makes it possible for the driver to know how their driving behavior while passing through the specific travel scene has contributed to the total optimization, or the driving behavior to be taken when passing through the same specific travel scene the next time.

<1-5. Effects>

As described above, the driver assistance system 100 according to the first embodiment of the disclosure calculates the total optimization evaluation value, based on the measurement data obtained by collecting the vehicle measurement data and the passer-by measurement data, and assists in driving the assistance target vehicle based on the total optimization evaluation value. The total optimization evaluation value indicates the influence of the change in the driving behavior of the driver on the total optimization when the assistance target vehicle 1 passes through the specific travel scene. The total optimization evaluation value to be calculated indicates the change in the mental state of, and the physical load on, the surrounding traffic participant present in the specific travel scene, caused by the driving behavior of the driver of the assistance target vehicle 1. According to the embodiment, it is possible to assist the driver in driving the assistance target vehicle 1 to take altruistic driving behavior that does not impose loads on the other traffic participants. Furthermore, in the driver assistance system 100 according to the first embodiment of the disclosure, it is also possible to suppress illegal driving behavior by assisting in taking total optimized driving behavior.

Moreover, before the assistance target vehicle 1 passes through the specific travel scene, the driver assistance system 100 according to the embodiment notifies the driver of the recommended driving behavior when passing through the specific travel scene based on the previous measurement data. Hence it is possible for the driver to take altruistic driving behavior that does not impose loads on the other traffic participants when passing through the specific travel scene. Furthermore, before the assistance target vehicle 1 passes through the specific travel scene, the driver assistance system 100 according to the embodiment may also notify the driver of the driving behavior that maximizes the total optimization evaluation value, as the recommended driving behavior. Hence, it is possible for the driver to take the driving behavior that makes it possible to enhance the total optimization the most when passing through the specific travel scene.

In addition, after the assistance target vehicle 1 passes through the specific travel scene, the driver assistance system 100 according to the embodiment notifies the driver of the advisory information regarding the influence of the driving behavior made by the driver of the assistance target vehicle 1 on the total optimization. Hence, it is possible for the driver to know how their driving behavior has influenced the load states of the surrounding traffic participants, and know the driving behavior to be taken by themselves from the next time onward. Moreover, after the assistance target vehicle 1 passes through the specific travel scene, the driver assistance system 100 according to the embodiment may also identify the driving behavior that has increased the total optimization evaluation value to the predetermined reference value or more, based on the previous measurement data, and notify the driver of the assistance target vehicle 1 of the advisory information. Hence, it is possible for the driver to know what kind of driving behavior should have been taken when passing through the specific travel scene, and know the driving behavior to be taken by the driver from the next time onward.

2. Second Embodiment

Next, a driver assistance system according to a second embodiment is described.

The driver assistance system according to the first embodiment described above is a system that assists the driver in manual driving of the assistance target vehicle. However, the driver assistance system of the disclosure is also applicable to a system that assists in automated driving of the assistance target vehicle. In the following, description is mainly given of the driver assistance system according to the second embodiment in terms of differences from the driver assistance system according to the first embodiment.

<2-1. Basic Configuration of Driver Assistance System)

A basic configuration of the driver assistance system according to the embodiment may be similar to the basic configuration of the driver assistance system according to the first embodiment illustrated in FIG. 1.

In the driver assistance system according to the embodiment, the assistance target vehicle 1 is configured to make an automated driving control. When the assistance target vehicle 1 encounters the specific travel scene, the management server 110 sets the recommended driving behavior based on the previous measurement data before passing through the specific travel scene, and transmits the assistance information to the driver assistance apparatus 50 of the assistance target vehicle 1. The driver assistance apparatus 50 that has received the assistance information sets a driving condition for automated driving of the assistance target vehicle 1 based on the information regarding the recommended driving behavior, and outputs information regarding the driving condition to the vehicle controller 41.

FIG. 18 is a block diagram illustrating a functional configuration of the driver assistance apparatus (first terminal) 50 of the assistance target vehicle 1 to which the driver assistance system according to the embodiment is applicable. In the embodiment, the driver assistance apparatus 50 includes a driving condition setter 75 instead of the notification processor 73. The driving condition setter 75 sets the driving condition to allow the assistance target vehicle 1 to travel by the automated driving. Specifically, the driving condition setter 75 sets a target vehicle speed or a target acceleration/deceleration rate, and a target steering angle or a target steering angular speed of the assistance target vehicle 1 in accordance with the recommended driving behavior set by the management server 110, and outputs the information regarding the set driving condition to the vehicle controller 41.

It is to be noted that the functional configuration of the mobile terminal 130 held by the passer-by H and the functional configuration of the management server 110 may be similar to the functional configuration of the driver assistance system 100 according to the first embodiment, and therefore, detailed description thereof is omitted.

<2-2. Processing Operation by Driver Assistance Apparatus>

Description is given next of processing operation by the driver assistance apparatus in the driver assistance system according to the embodiment.

A main routine of the processing operation by the driver assistance apparatus 50 may be similar to the processing operation by the driver assistance apparatus of the driver assistance system according to the first embodiment illustrated in FIG. 9. In the main routine, in the assistance processing in step S25, the pre-passing processing in step S33 in the flowchart illustrated in FIG. 10 differs from that in the first embodiment. In the following, with reference to FIG. 19, description is given of the pre-passing processing by the driver assistance apparatus 50 of the driver assistance system according to the embodiment.

First, the communication controller 71 of the processor 53 transmits the information indicating that the vehicle 1 is going to pass through the specific travel scene, and the vehicle measurement data to the management server 110 together with the identification information regarding the driver in the same procedure as in step S41 in the flowchart illustrated in FIG. 11 (step S41).

Next, the driving condition setter 75 of the processor 53 receives the assistance information transmitted from the management server 110 (step S43). The assistance information transmitted by the management server 110 includes the information regarding the recommended driving behavior that possibly enhances the total optimization when the vehicle 1 passes through the specific travel scene.

Next, the driving condition setter 75 detects the surrounding environment of the vehicle 1 based on the sensor signal or the image data outputted from the surrounding environment sensor 31 (step S46). Thus, the driving condition setter 75 recognizes a change in the road structure in the direction of advance of the assistance target vehicle 1, and changes in the positions, the directions of movement, and the speeds of movement of the surrounding traffic participants.

Next, the driving condition setter 75 sets the driving condition corresponding to a change in the surrounding environment, based on the information regarding the recommended driving behavior acquired from the management server 110 (step S47). Specifically, the driving condition setter 75 sets, in accordance with the change in the surrounding environment, the target speed/deceleration rate and the target steering angular speed to realize the driving behavior in line with the recommended driving behavior.

Next, the driving condition setter 75 outputs the information regarding the set driving condition to the vehicle controller 41 (step S48). The vehicle controller 41 that has received the information regarding the driving condition sets operation command values for the driving force source 9, the electric steering device 15, and the hydraulic unit 16 based on the information regarding the driving condition, and controls the driving of the driving force source 9, the electric steering device 15, and the hydraulic unit 16.

Next, the driving condition setter 75 determines whether the assistance target vehicle 1 have finished passing through the specific travel scene (step S49). When the driving condition setter 75 does not determine that the assistance target vehicle 1 has finished passing through the specific travel scene (S49/No), the driving condition setter 75 causes the flow to return to step S46 and repeats the setting and the outputting of the driving condition. Meanwhile, when the driving condition setter 75 determines that the assistance target vehicle 1 has finished passing through the specific travel scene (S49/Yes), the driving condition setter 75 ends the pre-passing processing.

The assistance target vehicle 1 repeatedly performs the detection of the surrounding environment, the setting of the driving condition, and the outputting of the driving condition over a period from an encounter with the travel scene to the end of the passing. Specifically, in the above-described example of the travel scene where the travel zones merge, let us assume that the driving behavior of creating space in front of a subject vehicle at a lane merging point where the subject vehicle travels in the travel zone on the merged side by automated driving, and letting a random vehicle traveling in the travel zone on the merging side cut in is set as the recommended driving behavior.

In this case, the driving condition setter 75 sets the driving condition that makes it possible to allow the assistance target vehicle 1 to travel while maintaining a predetermined inter-vehicle distance from the assistance target vehicle 1 to a preceding vehicle until the assistance target vehicle 1 approaches a point of a predetermined distance to the merging point. Moreover, when the assistance target vehicle 1 approaches the point of the predetermined distance to the merging point, the driving condition setter 75 starts deceleration of the assistance target vehicle 1 to create space to let the random vehicle traveling in the travel zone on the merging side cut in. This behavior corresponds to an action that changes the driving behavior. At this occasion, to inhibit sudden operation of deceleration, the driving condition setter 75 sets the target deceleration rate within a range equal to or less than the maximum deceleration rate. Furthermore, when the random vehicle cuts in on the subject vehicle and the merging is finished, the driving condition setter 75 sets the driving condition that makes it possible to allow the assistance target vehicle 1 to travel while maintaining the predetermined inter-vehicle distance from the assistance target vehicle 1 to the random vehicle that has merged.

<2-3. Effects>

As described above, the driver assistance system 100 according to the second embodiment of the disclosure calculates the total optimization evaluation value, based on the measurement data obtained by collecting the vehicle measurement data and the passer-by measurement data, and assists in driving the assistance target vehicle based on the total optimization evaluation value. The total optimization evaluation value indicates the influence of the change in the driving behavior of the driver on the total optimization when the assistance target vehicle 1 passes through the specific travel scene. The total optimization evaluation value to be calculated indicates the change in the mental state of, and the physical load on, the surrounding traffic participant present in the specific travel scene to be caused by the driving behavior of the automated driving of the assistance target vehicle 1. According to the embodiment, it is possible to assist in the automated driving of the assistance target vehicle 1 to take the altruistic driving behavior that does not impose loads on other traffic participants.

In particular, before the assistance target vehicle 1 passes through the specific travel scene, the driver assistance system 100 according to the embodiment sets the recommended driving behavior when passing through the specific travel scene, based on the previous measurement data, and sets the driving condition for the automatic driving. Hence, it is possible for the assistance target vehicle 1 to take the altruistic driving behavior that does not impose loads on other traffic participants when passing through the specific travel scene by the automated driving.

Although the preferred embodiments of the disclosure have been described in detail in the foregoing with reference to the accompanying drawings, the technology of the disclosure is by no means limited to such examples. It should be appreciated that various modifications and alterations may be made by persons skilled in the art without departing from the scope as defined by the appended claims. The disclosure is intended to include such modifications and alterations.

For example, the information to be used for the calculation of the total optimization evaluation value is not limited to the examples described in the forgoing embodiments. For example, in calculating the total optimization evaluation value regarding the mental states of the surrounding traffic participants, information regarding a schedule of action of each of the surrounding traffic participants may be used. For example, the total optimization evaluation value may be calculated by using the information regarding the schedule of the action held in the mobile terminal 130 carried by the passer-by H or a mobile terminal of a driver communicatably coupled to the driver assistance apparatus, and information regarding a destination and a target arrival time set in a navigation system of the vehicle. It is possible to enhance accuracy of the estimation of the mental state of each of the surrounding traffic participants by reflecting, in the mental state, information regarding whether the surrounding traffic participant is in a hurry. Whether the surrounding traffic participant is in a hurry is determined based on the schedule of the action of the surrounding traffic participant. Hence it is possible to enhance the total optimization more realistically.

Moreover, in the forgoing embodiments, the management server carries out the processing to set the information to assist in driving the vehicle based on various kinds of information, but the driver assistance apparatus of the assistance target vehicle may have the function. In addition, the mobile terminal, the management server, and the driver assistance apparatus described in the forgoing embodiments may exchange some of their functions with one another.

Furthermore, the technology of the disclosure may also be realized as a vehicle including the driver assistance system described in the forgoing embodiments, a driver assistance processing method by the driver assistance system, a computer program that causes a computer to function as the driver assistance system, and a non-transitory tangible recording medium that contains the computer program.

According to the disclosure, it is possible to assist in realizing total optimized driving that does not impose loads on other traffic participants.

The invention claimed is:

1. A driver assistance system configured to assist in driving vehicles, comprising:
a collected data storage configured to hold
vehicle measurement data transmitted from first terminals respectively mounted on the vehicles, and including driver state information regarding load states of drivers of the vehicles measured in a predetermined specific travel scene set in advance, and
passer-by measurement data transmitted from second terminals respectively carried by passers-by, and including passer-by state information regarding load states of the passers-by measured in the predetermined specific travel scene; and
a processor configured to carry out processing to assist in driving an assistance target vehicle of the vehicles based on the collected vehicle measurement data and the collected passer-by measurement data,
wherein the processor is configured to carry out
total optimization calculation processing to calculate, based on the vehicle measurement data and the passer-by measurement data, a first load state value with a change in driving behavior of a driver of the assistance target vehicle in the predetermined specific travel scene and a second load state without the change in the driving behavior of the driver of the assistance target vehicle in the predetermined specific travel scene, and calculate a total optimization evaluation value based on a difference between the first load state value and the second load state value, the first load state value and the second load state value being load state values indicating a change in each of the load states of the drivers of random vehicles and the passers-by present in the predetermined specific travel scene while the assistance target vehicle is traveling through the predetermined specific travel scene, and the total optimization evaluation value indicating an influence of the driving behavior of the assistance target vehicle on total optimization, and
driver assistance processing to assist in driving the assistance target vehicle based on the total optimization evaluation value;
wherein the processor is further configured to,
in the total optimization calculation processing,
after the assistance target vehicle has passed through the predetermined specific travel scene, acquire the vehicle measurement data regarding the assistance target vehicle and the random vehicles while the assistance target vehicle is passing through the predetermined specific travel scene and the passer-by measurement data regarding the passers-by present in the predetermined specific travel scene, and
calculate the first load state value and the second load state value, and calculate the total optimization evaluation value, based on the acquired vehicle measurement data and the acquired passer-by measurement data, and the vehicle measurement data and the passer-by measurement data held in the collected data storage, and in the driver assistance processing,
notify, based on the total optimization evaluation value, the driver of the assistance target vehicle of information regarding the influence of the driving behavior made by the driver of the assistance target vehicle on the total optimization.

2. The driver assistance system according to claim 1, wherein
the load states of the drivers and the passers-by comprise one or both states of a mental load and a physical load.

3. The driver assistance system according to claim 1, wherein
the processor is configured to,
in the driver assistance processing,
identify previous driving behavior that has increased the total optimization evaluation value to a predetermined reference value or more by the change in the driving behavior in the predetermined specific travel scene though which the assistance target vehicle has passed, and notify, based on the previous driving behavior, the driver of the assistance target vehicle of advisory information.

4. The driver assistance system according to claim 1, wherein the processor is configured to, in the total optimization calculation processing, before the assistance target vehicle passes through the predetermined specific travel scene, calculate the first load state value and the second load state value, and calculate the total optimization evaluation value, based on the vehicle measurement data and the passer-by measurement data held in the collected data storage, in the driver assistance processing, determine recommended driving behavior based on the total optimization evaluation value and notify the driver of the assistance target vehicle of information regarding the recommended driving behavior.

5. The driver assistance system according to claim 4, wherein the processor is configured to, in the total optimization calculation processing, calculate the first load state value and the second load state value, and calculate the total optimization evaluation value, with respect to multiple kinds of driving behavior when passing through the predetermined specific travel scene, and in the driver assistance processing, assume driving behavior that maximizes the total optimization evaluation value as the recommended driving behavior and notify the driver of the assistance target vehicle of the information regarding the recommended driving behavior.

6. The driver assistance system according to claim 1, wherein the processor is configured to, in the total optimization calculation processing, before the assistance target vehicle passes through the predetermined specific travel scene, calculate the first load state value and the second load state value when passing through the predetermined specific travel scene, and calculate the total optimization evaluation value, based on the vehicle measurement data and the passer-by measurement data held in the collected data storage, and in the driver assistance processing, obtain driving behavior that increases the total optimization evaluation value to a predetermined reference value or more, and sets a driving condition for automated driving of the assistance target vehicle.

7. The driver assistance system according to claim 1, wherein the vehicle measurement data comprises vehicle state information regarding an amount of energy consumption of each of the vehicles, and the processor is configured to, in the total optimization calculation processing, further calculate a first energy state value and a second energy state value, and calculate the total optimization evaluation value indicating the influence of the driving behavior of the assistance target vehicle on the total optimization, based on a difference between the first energy state value and the second energy state value, the first energy state value indicating a change in the amount of energy consumption of each of the random vehicles with the change in the driving behavior of the driver of the assistance target vehicle while the assistance target vehicle is traveling through the predetermined specific travel scene, and the second energy state value indicating the change in the amount of energy consumption of each of the random vehicles without the change in the driving behavior of the driver of the assistance target vehicle while the assistance target vehicle is traveling through the predetermined specific travel scene.

8. A driver assistance method to assist in driving vehicles, the driver assistance method comprising causing a computer to:

based on vehicle measurement data transmitted from first terminals respectively mounted on the vehicles, and including driver state information regarding load states of drivers of the vehicles measured in a predetermined specific travel scene set in advance, and passer-by measurement data transmitted from second terminals respectively carried by passers-by, and including passer-by state information regarding load states of the passers-by measured in the predetermined specific travel scene, calculate a first load state value with a change in driving behavior of a driver of an assistance target vehicle of the vehicles in the predetermined specific travel scene and a second load state without the change in the driving behavior of the driver of the assistance target vehicle in the predetermined specific travel scene, and calculate a total optimization evaluation value based on a difference between the first load state value and the second load state value, the first load state value and the second load state value being load state values indicating a change in each of the load states of the drivers of random vehicles and the passers-by present in the predetermined specific travel scene while the assistance target vehicle is traveling through the predetermined specific travel scene, and the total optimization evaluation value indicating an influence of the driving behavior of the assistance target vehicle on total optimization, and assist in driving the assistance target vehicle based on the total optimization evaluation value;

in the total optimization calculation processing, after the assistance target vehicle has passed through the predetermined specific travel scene, acquire the vehicle measurement data regarding the assistance target vehicle and the random vehicles while the assistance target vehicle is passing through the predetermined specific travel scene and the passer-by measurement data regarding the passers-by present in the predetermined specific travel scene, and calculate the first load state value and the second load state value, and calculate the total optimization evaluation value, based on the acquired vehicle measurement data and the acquired passer-by measurement data, and the vehicle measurement data and the passer-by measurement data held in the collected data storage, and in the driver assistance processing, notify, based on the total optimization evaluation value, the driver of the assistance target vehicle of information regarding the influence of the driving behavior made by the driver of the assistance target vehicle on the total optimization.

9. A non-transitory tangible recording medium containing a computer program, the computer program causing a computer to:

based on vehicle measurement data transmitted from first terminals respectively mounted on vehicles, and including driver state information regarding load states of drivers of the vehicles measured in a predetermined specific travel scene set in advance, and passer-by measurement data transmitted from second terminals respectively carried by passers-by, and including passer-by state information regarding load states of the passers-by measured in the predetermined specific travel scene, calculate a first load state value with a change in driving behavior by a driver of an assistance target vehicle of the vehicles in the predetermined specific travel scene and a second load state without the change in the driving behavior by the driver of the assistance target vehicle in the predetermined specific travel scene, and calculate a total optimization evaluation value based on a difference between the first load state value and the second load state value, the first load state value and the second load state value being load state values indicating a change in each of the load states of the drivers of random vehicles and the passers-by present in the predetermined specific travel scene while the assistance target vehicle is traveling through the predetermined specific travel scene, and the total optimization evaluation value indicating an influence of the driving behavior of the assistance target vehicle on total optimization, and assist in driving the assistance target vehicle based on the total optimization evaluation value;

wherein the processor is further configured to, in the total optimization calculation processing, after the assistance target vehicle has passed through the predetermined specific travel scene, acquire the vehicle measurement data regarding the assistance target vehicle and the random vehicles while the assistance target vehicle is passing through the predetermined specific travel scene and the passer-by measurement data regarding the passers-by present in the predetermined specific travel scene, and calculate the first load state value and the second load state value, and calculate the total optimization evaluation value, based on the acquired vehicle measurement data and the acquired passer-by measurement data, and the vehicle measurement data and the passer-by measurement data held in the collected data storage, and in the driver assistance processing, notify, based on the total optimization evaluation value, the driver of the assistance target vehicle of information regarding the influence of the driving behavior made by the driver of the assistance target vehicle on the total optimization.

* * * * *